US010907997B2

(12) United States Patent
Evans et al.

(10) Patent No.: US 10,907,997 B2
(45) Date of Patent: Feb. 2, 2021

(54) ENCODER APPARATUS

(71) Applicant: RENISHAW PLC, Wotton-under-Edge, Gloucestershire (GB)

(72) Inventors: Finlay Jonathan Evans, Malmesbury (GB); James Reynolds Henshaw, Stroud (GB); Stephen Lindsey Tocknell, Stroud (GB)

(73) Assignee: RENISHAW PLC, Wotton-under-Edge (GB)

( * ) Notice: Subject to any disclaimer, the term of this patent is extended or adjusted under 35 U.S.C. 154(b) by 13 days.

(21) Appl. No.: 15/775,961

(22) PCT Filed: Dec. 1, 2016

(86) PCT No.: PCT/GB2016/053779
§ 371 (c)(1),
(2) Date: May 14, 2018

(87) PCT Pub. No.: WO2017/093738
PCT Pub. Date: Jun. 8, 2017

(65) Prior Publication Data
US 2018/0356261 A1   Dec. 13, 2018

(30) Foreign Application Priority Data

Dec. 3, 2015 (EP) .................................... 15275245
Dec. 3, 2015 (EP) .................................... 15275246

(51) Int. Cl.
*G01D 5/347* (2006.01)
(52) U.S. Cl.
CPC ..... *G01D 5/34761* (2013.01); *G01D 5/34715* (2013.01); *G01D 5/34753* (2013.01); *G01D 5/34776* (2013.01)

(58) Field of Classification Search
CPC ........................... G01D 5/34753; G01D 11/10
See application file for complete search history.

(56) References Cited

U.S. PATENT DOCUMENTS

| 4,136,958 A | 1/1979 | Nelle |
| 4,295,742 A * | 10/1981 | Nelle ................. G01D 5/34753 33/707 |

(Continued)

FOREIGN PATENT DOCUMENTS

| CN | 2667458 Y | 12/2004 |
| CN | 1675520 A | 9/2005 |

(Continued)

OTHER PUBLICATIONS

"Renishaw's Resolute™ Absolute Encoder Supports ITRI Breakthrough in Multi-Axis Rotatry Table Design" 2015 pp. 1-8; http://www.renishaw.com/en/.

(Continued)

*Primary Examiner* — Thanh Luu
(74) *Attorney, Agent, or Firm* — Oliff PLC

(57) ABSTRACT

An encoder apparatus comprising a scale and a readhead assembly comprising a scale signal receiver. The scale and the scale signal receiver are located within a protective housing which is configured to protect them from contamination located outside the protective housing and comprises a seal through which the scale signal receiver can be connected to a part outside the protective housing. The arrangement of the scale signal receiver inside the protective housing is independent of the scale and protective housing.

22 Claims, 9 Drawing Sheets

(56) References Cited

U.S. PATENT DOCUMENTS

| | | |
|---|---|---|
| 4,369,578 A | 1/1983 | Ernst |
| 4,595,991 A | 6/1986 | Spies |
| 4,892,416 A | 1/1990 | Hassler, Jr. et al. |
| 5,051,971 A | 9/1991 | Yamagishi et al. |
| 5,241,173 A | 8/1993 | Howley et al. |
| 7,253,609 B2 | 8/2007 | Schmidt et al. |
| 7,550,710 B2 | 6/2009 | McAdam |
| 8,505,210 B2 | 8/2013 | Gribble et al. |
| 8,742,956 B2 | 6/2014 | Gordon-Ingram et al. |
| 8,826,753 B2 | 9/2014 | Kobayashi et al. |
| 9,032,638 B2 | 5/2015 | Sivec et al. |
| 9,234,734 B2 | 1/2016 | Schmoller et al. |
| 9,541,423 B2 | 1/2017 | Kogej et al. |
| 9,625,277 B2 | 4/2017 | Niebling et al. |
| 2002/0145108 A1 | 10/2002 | Rodi |
| 2005/0046413 A1 | 3/2005 | Schmidt et al. |
| 2005/0206372 A1 | 9/2005 | Ratnaparkhi |
| 2006/0107545 A1 | 5/2006 | Boge |
| 2011/0209352 A1* | 9/2011 | Affa .................. G01D 5/34715 33/706 |
| 2012/0072169 A1 | 3/2012 | Gribble |
| 2013/0248698 A1* | 9/2013 | Ezaki .................. G01D 5/34715 250/231.1 |
| 2014/0284464 A1 | 9/2014 | Motoyuki |
| 2015/0233734 A1 | 8/2015 | Niebling et al. |

FOREIGN PATENT DOCUMENTS

| | | |
|---|---|---|
| CN | 1789921 A | 6/2006 |
| CN | 102197282 A | 9/2011 |
| CN | 102203563 A | 9/2011 |
| CN | 102235886 A | 11/2011 |
| CN | 102388294 A | 3/2012 |
| CN | 102460077 A | 5/2012 |
| CN | 103299163 A | 9/2013 |
| CN | 104160248 A | 11/2014 |
| DE | 9210318 U1 | 10/1992 |
| DE | 4404490 A1 | 8/1995 |
| DE | 10243177 A1 | 5/2003 |
| DE | 102004060093 A1 | 6/2006 |
| EP | 0462425 A1 | 12/1991 |
| EP | 2 369 302 A1 | 9/2011 |
| FR | 2353044 A1 | 12/1977 |
| JP | S48-076956 U | 9/1973 |
| JP | S54-126566 A | 10/1979 |
| JP | H05-133732 A | 5/1993 |
| JP | 2001-317967 A | 11/2001 |
| JP | 2008-503746 A | 2/2008 |
| JP | 2010-286452 A | 12/2010 |
| JP | 2012-507022 A | 3/2012 |
| JP | 2013-007575 A | 1/2013 |
| JP | 2013-200235 A | 10/2013 |
| JP | 2014-157153 A | 8/2014 |
| JP | 2014-182054 A | 9/2014 |
| TW | M408192 U | 7/2011 |
| TW | M495504 U | 2/2015 |

OTHER PUBLICATIONS

Heidenhain. "Rotary Encoders", 2014, Brochure pp. 1-88.
Dec. 2, 2016 Office Action issued in Taiwan Patent No. 105140028.
Heidenhain. "Liner Encoders for Numericallly Controlled Machine Tools", 2014, Brochure. pp. 1-56.
Heidenhain. "Angle Encoders Without Integral Bearing", 2014, Brochure., pp. 1-68.
Heidenhain. "Angle Encoders With Integral Bearing" 2015, Brochure., pp. 1-64.
Heidenhain. "Encoders for Servo Drives", 2014, Brochure. pp. 1-96.
Heidenhain, Johannes. "Rotary Encoders With Integral Bearing", 2015, Webpage. pp. 1, https://www.hieidenhain.co.uk/en_UK/.
Heidenhain, Johannes. "Rotary Encoders", Measuring Angles with Rotary Encoders, 2015, http://www.heidenhain.co.uK/en_uk/.
Heidenhain. "Mounting Instructions" ERP 880, 2003, pp. 1-42.
Magnescale Co., Ltd., "Magnescale Smartscale" Brochure pp. 1-2.
Campbell & George Co., "Heidenhain-ECI 119 Absolute Inductive Rotary Encoder" 2015, pp. 1-2, http://www.cgco.com/news/19-heidenhain/.
Murray, Charles. "Sensor's Resolution is Less Than the Diameter of an Atom". pp. 1-4, 2016, http://www.designnews.com/document.asp?doc_id=281644&.
Dec. 5, 2018 Office Action issued in Taiwanese Patent Application No. 105140028.
Feb. 14, 2017 International Search Report issued in International Patent Application No. PCT/GB2016/053779.
Feb. 14, 2017 Written Opinion issued in International Patent Application No. PCT/GB2016/053779.
Mar. 15, 2016 Extended Search Report issued in European Patent Application No. 152752465.
Mar. 15, 2016 Extended Search Report issued in European Patent Application No. 15275245.7.
Feb. 14, 2017 Written Opinion issued in International Patent Application No. PCT/GB2016/053778.
Feb. 14, 2017 International Search Report issued in International Patent Application No. PCT/GB2016/053778.
U.S. Appl. No. 15/775,970, filed May 14, 2018 in the name of Evans et al.

* cited by examiner

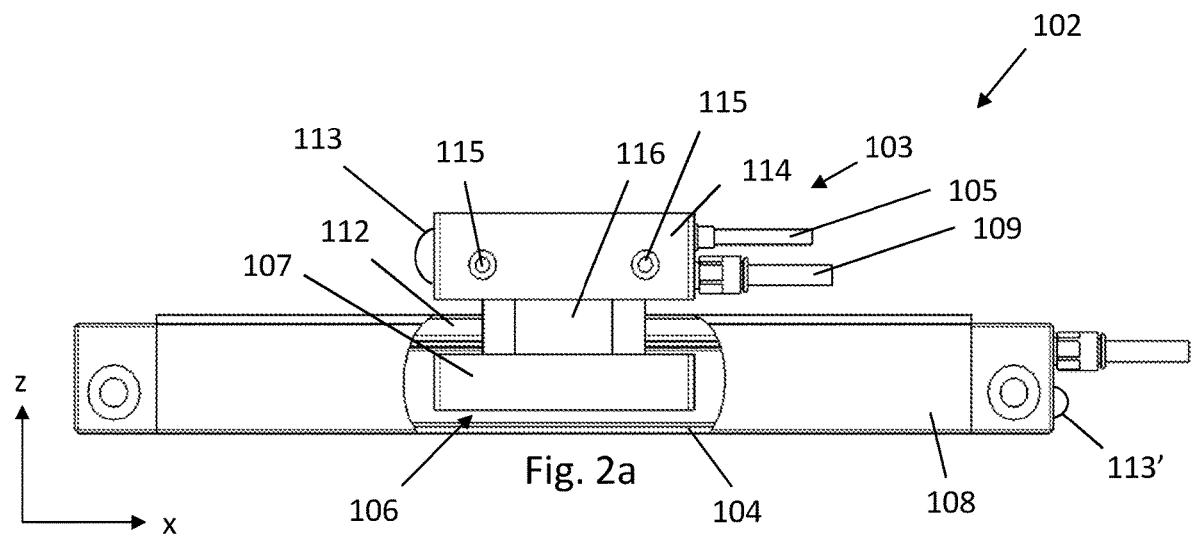
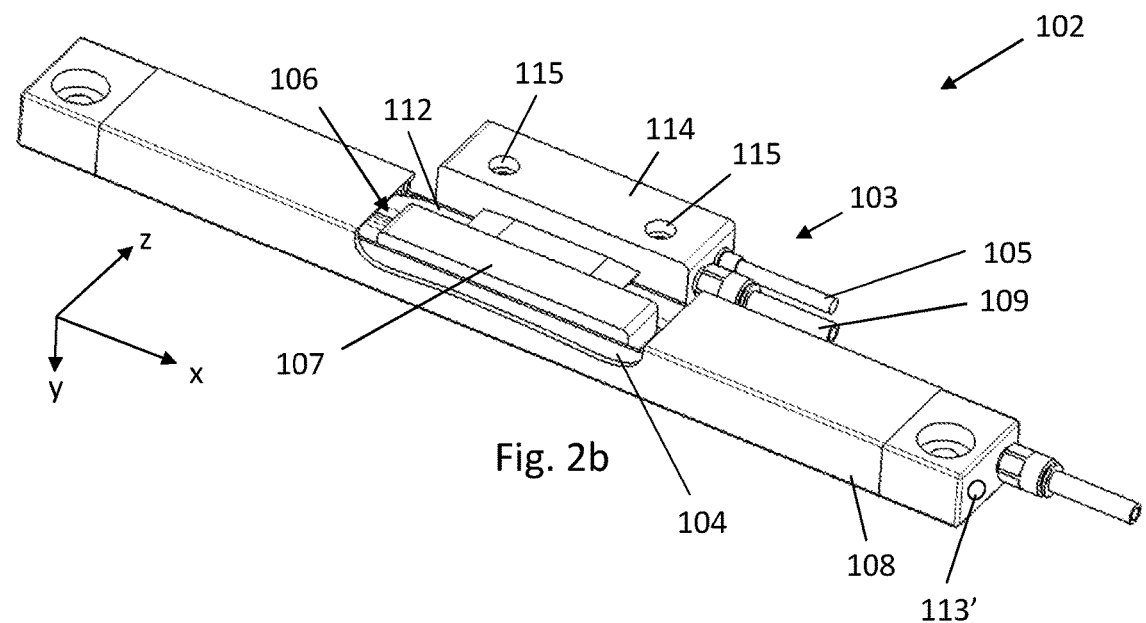

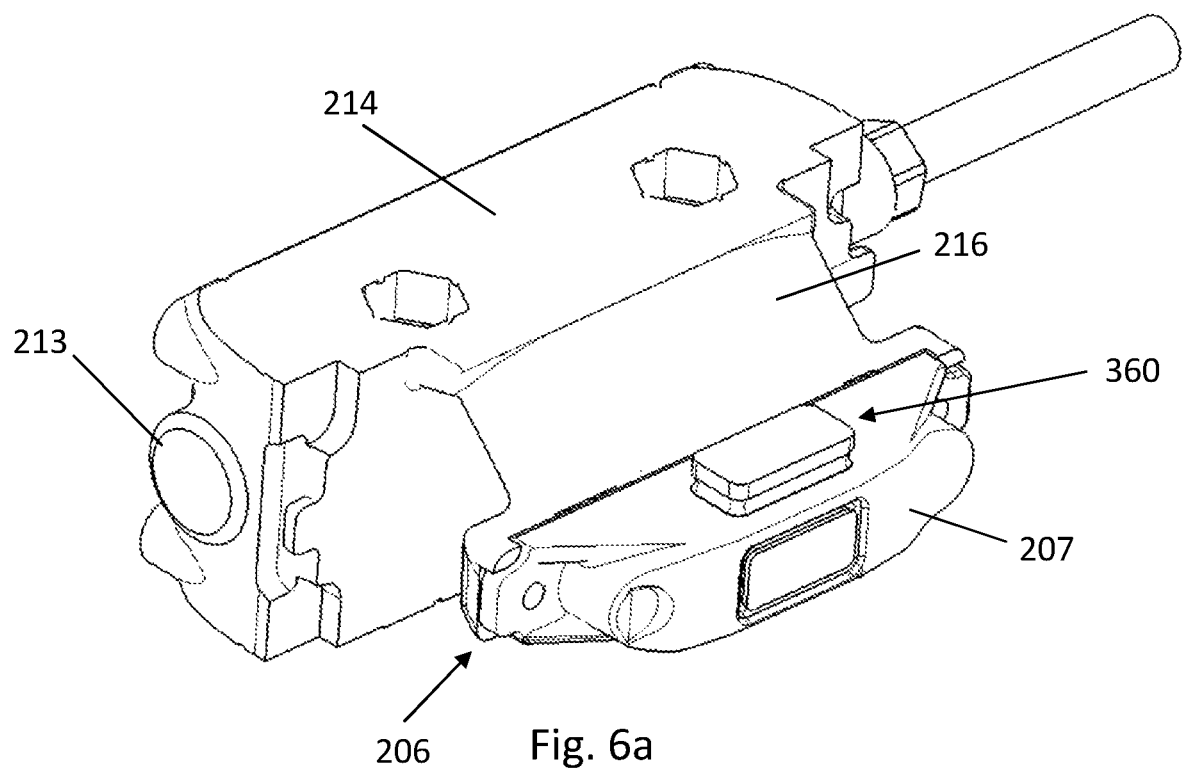
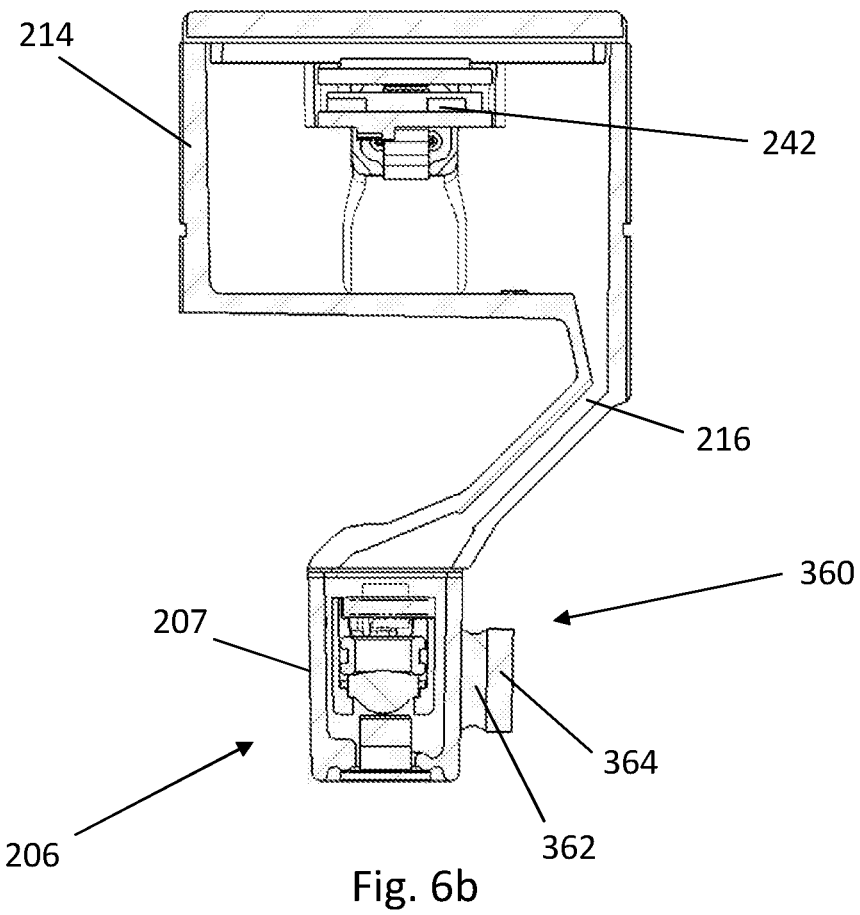

ENCODER APPARATUS

This invention relates to an encoder apparatus. For instance, the invention relates to what is commonly known as an enclosed encoder, also commonly known as a sealed encoder.

Encoders are used in many industries to provide position (or its derivatives, e.g. velocity and/or acceleration) feedback to a control system of a machine, e.g. feedback control for the position/motion of one part of a machine relative to another part of the machine. As will be understood, typically a scale is provided on one part of the machine and a readhead for reading the scale is provided on the other part of the machine such that the relative position of scale and readhead, and hence the relative position of the machine parts, can be detected by the readhead along the encoder's measurement dimension.

The technologies utilised by such encoders can require that the environment in which they are used is clean and free of contamination, e.g. dust, dirt and moisture (which could, for example, be oil and/or water based). Contamination on the scale and/or readhead can adversely affect the performance of the encoder. In many industries such machines that use encoders operate in an appropriately clean environment, in which case what is commonly referred to as an "exposed encoder" (or "open encoder") can be used.

However there are instances, such as in the machine tool industry for example, where the working environment is not clean, and where fluids and solid debris are prevalent. In such cases there exist encoders which are protected against such detrimental environments. Typically, in these circumstances, sealed (also known as enclosed) encoders are used.

An example of a sealed encoder module 2 is schematically illustrated in FIGS. 1a to 1d. As illustrated, the sealed encoder module 2 comprises a scale 4 and a readhead assembly comprising a scale signal receiver 6. The scale 4 and the scale signal receiver 6 are located inside a protective housing 8 which protects them from contaminants external to the protective housing. The scale 4 is fixed to the protective housing 8 whereas the scale signal receiver 6 of the readhead assembly can move along the length of the scale 4 within the protective housing 8. In use, the protective housing 8 will be secured to a first part of a machine (not shown) and the readhead assembly will be secured to a second part of the machine, which is moveable relative to the first part along the x axis. In practice, during use, the first part of the machine (and hence the protective housing/scale) could be configured to move, and/or the second part of the machine (and hence the readhead) could be configured to move.

The readhead assembly comprises a mounting block 14 which is to be directly fastened to the second part of the machine (e.g. via bolts passing through bolt holes 15 in the mounting block 14), a blade 16 and an articulated linkage 18 which connects the scale signal receiver 6 to the blade 16 (described in more detail below).

The protective housing 8 further comprises a seal in the form of a pair of sealing lips 12 which seals the inside of the protective housing 8, in which the scale 4 and scale signal receiver 6 reside, from external contaminants. The blade 16 passes through the seal (between the pair of sealing lips 12) and the sealing lips 12 allow the movement of the blade 16 and hence the scale signal receiver 6 along the length of the protective housing 8/scale 4.

The position of the scale signal receiver 6 relative to the scale 4 in all degrees of freedom other than along the length of the scale is tightly controlled by bearings (e.g. roller bearings) in the scale signal receiver 6 which engage and bear against the scale 4 (but as will be understood could additionally/alternatively bear against the inside of the protective housing). Springs (not shown) bias the scale signal receiver's bearings 20 against the scale 4. Any misalignment in the axis of the first and second parts of the machine is accommodated by the articulated linkage 18. In this embodiment, the articulated linkage 18 is provided by a joint, which includes at least one pivot joint. The articulated linkage permits pitching, rolling and yawing (i.e. rotational movement about three mutually perpendicular axes) of the scale signal receiver 6 relative to the mounting block 14, as well as lateral motion of the scale signal receiver 6 relative to the mounting block 14 in directions perpendicular to the measuring dimension (length of the scale). Accordingly, other than along the measuring dimension (along the x axis in the shown embodiment), the position and motion of the scale signal receiver 6 is constrained by the scale 4. In other words, the scale signal receiver 6 is guided by the scale 4. The articulated linkage 18 therefore decouples the scale signal receiver 6 and mounting block 14 in all degrees of freedom other than along the dimension of measurement of the encoder apparatus (which should be coincident with the direction of motion of the first and second parts of the machine), which in the embodiment shown in FIG. 1 is along the x axis. This is the sort of encoder apparatus that is disclosed in U.S. Pat. No. 4,595,991.

As also shown in FIG. 1b, a power/communications cable 5 can be provided to enable the readhead assembly to be powered and facilitate communication between the readhead assembly and an external processor device (e.g. a machine controller). Furthermore, an air supply line 9 can be provided for supplying air into the protective housing 8, so as to create a positive pressure within the protective housing 8. Accordingly, in the case that the sealing lips 12 do not form a perfect seal (in particular where the lip seals are parted by the blade 16) air will tend to flow out of the protective housing 8 due to the positive pressure. The positive pressure thereby provides further resistance to physical contamination trying to enter the protective housing 8. As will be understood such contamination can comprise solid and/or fluid contamination, examples of which include swarf, liquid (e.g. coolant) and/or air-borne moisture. As also shown, another air supply line 7 which supplies air into the protective housing via the readhead assembly (e.g. via a conduit passing through the mounting block 14 and blade 16) can be provided.

The present invention provides an improved encoder apparatus. In particular cases, the present invention relates to improvements to sealed encoders. For instance, according to the present invention there is provided a sealed encoder module comprising a scale, a readhead and a protective housing (e.g. an integral protective housing). In particular, aspects of the invention described herein relate to an improved encoder of the type where the readhead's scale signal receiving part is located on a first side of a seal and the readhead's mounting part is located on a second side of the seal.

According to a first aspect of the invention there is provided an encoder comprising a scale and a readhead assembly moveable relative to each other. The readhead assembly can comprise a scale signal receiver. The scale and the scale signal receiver can be located within a protective housing which is configured to protect them from contamination located outside the protective housing. The protective housing can comprise a seal through which the scale signal receiver can be connected to a part outside the protective housing. The arrangement of the scale signal receiver inside the protective housing can be independent of the scale and protective housing.

Whilst the enclosed encoder of the sort shown in FIG. 1 provides a guaranteed relationship of the scale and scale signal receiver (e.g. guaranteed ride-height), such an arrangement of an articulated linkage, with rolling/sliding element bearings can have detrimental effects, such as hysteresis position errors caused by friction and linkage compliance, and position errors caused by for example pitching errors of the scale signal receiver caused by bearing runout errors or dirt under the bearings. This aspect of the invention relates to a sealed/enclosed encoder that removes such hysteresis and position errors by making the (physical) arrangement of the scale signal receiver inside the protective housing independent of the scale and protective housing (that is the physical relationship of the scale signal receiver with respect to the scale is independent). In other words, the arrangement of the scale signal receiver inside the protective housing can be independent of the scale and protective housing in at least one degree of freedom other than in the measuring degree of freedom. As will be understood, a degree of freedom could be a rotational or a linear degree of freedom. Preferably, the arrangement of the scale signal receiver inside the protective housing is independent of the scale and protective housing in all linear and rotary degrees of freedom. Accordingly, the enclosed encoder of the invention can be provided without any bearings between the scale signal receiver and the scale and/or protective housing. In other words, the enclosed encoder of the invention can be provided without any bearings that engage and/or constrain the scale signal receiver to the scale and/or protective housing. Accordingly, the arrangement of the scale signal receiver within the protective housing is constrained independently of the scale and protective housing, and in other words is not constrained by the scale or protective housing. This avoids the need for an articulated linkage. Rather, the present invention relies on external means for guiding the scale signal receiver relative to the scale. Accordingly, as will be understood, the scale signal receiver could be described as being externally constrained, as being unguided, as being without integral bearing, or as being bearingless. Another way of looking at this is that the scale signal receiver is held suspended (in other words in a suspended state) within the protective housing.

As will be understood, the scale signal receiver and the protective housing are moveable relative to each other along the measuring dimension of the scale. Accordingly, as will be understood, the scale signal receiver is located within (and protected by) the protective housing, but not mounted to the protective housing. As will be understood, the seal permits relative movement of the scale signal receiver and the protective housing along the measuring dimension of the scale. Accordingly, as described in more detail below, the seal extends along the measuring dimension. The seal could also accommodate some relative movement of the scale signal receiver and the protective housing in other dimensions.

The encoder can be what is commonly referred to as a sealed encoder (also commonly known as an enclosed encoder). These can also be known as a sealed (enclosed) encoder module.

The protective housing can be an integral part of the encoder. Optionally, the scale is mounted to the protective housing. The encoder could be configured such that the scale is configured to be mounted to a part of a machine (the position of which is to be measured by the encoder) via the protective housing. That is the protective housing could comprise one or more mounting features via which the scale is configured to be mounted to a part of a machine. Accordingly, optionally the protective housing can lie between the scale and the part of the machine that the encoder module is configured to be mounted to. As will be understood, the protective housing could be configured such that in use it is a single fixed unit (i.e. it does not comprise parts which move relative to each other, e.g. with the movement of the relatively moveable parts of the machine on which it is mounted).

As will be understood, the scale signal receiver can be the part of the readhead assembly located inside the protective housing which receives the signal from the scale. The scale signal receiver can comprise one or more components for interacting with the scale signal, e.g. so as to detect the scale signal and/or manipulate the scale signal before it is subsequently detected. For example, in the case of an optical encoder, the scale signal receiver can comprise one or more optical elements, such as diffractive and/or refractive optical elements. For example, the scale signal receiver can comprise one or more lenses, and/or one or more diffraction gratings. The scale signal receiver could comprise one or more signal guides for guiding the scale signal to another component. For example, in the case of an optical encoder, the scale signal receiver could comprise a wave guide, e.g. a light guide (for instance, an optical fibre). The signal guide could be configured to carry the scale signal to a subsequent component which interacts with the scale signal, e.g. so as to manipulate the scale signal. The signal guide could be configured to carry the scale signal to one or more detectors/sensors configured to detect the scale signal, e.g. a transducer.

Optionally, the readhead assembly comprises one or more sensors for sensing the scale signal (which as described above may or may not have been manipulated by one or more components in the readhead assembly). The sensor could comprise a plurality of sensor elements, e.g. an array of sensor elements. The scale signal receiver could comprise the sensor(s). Optionally, the sensor could be located elsewhere in the readhead assembly. For example, the sensor could be located in a part of the readhead assembly which is located outside the protective housing. For example, in those embodiments in which the readhead assembly comprises a mounting block (described in more detail below), the sensor (and indeed any other components mentioned above) could be located in the mounting block.

In those embodiments in which the scale signal receiver comprises an outer casing (described in more detail below), the scale signal receiver can comprise one or more features for enabling the signal from the scale to enter the scale signal receiver. For example, in the case of an optical encoder, the scale signal receiver could comprise a window.

The readhead assembly can comprise one or more emitters for emitting energy toward the scale. For example, the readhead assembly can comprise at least one light source configured to illuminate the scale (e.g. with light in the infra-red to ultraviolet range). The scale signal receiver can comprise said one or more emitters. Optionally, said one or more emitters can be provided by another part of the readhead assembly (e.g. outside the protective housing, such as provided by a mounting block).

Optionally, the readhead, e.g. the scale signal receiver, (for instance its sensor(s)) is configured to detect a signal generated by light coming from the scale. Optionally the light has been transmitted through the scale. Optionally, the light has been reflected from the scale. Accordingly, optionally, the readhead, e.g. the scale signal receiver, comprises an emitter (e.g. a light source) and a sensor. The emitter and sensor could be located on the same side of the scale. Accordingly, the encoder can be a reflective encoder apparatus.

As will be understood, the scale will have some form of features/markings which can be read by the readhead to determine displacement, position (or its derivatives, e.g. velocity and/or acceleration). Such features could define a pattern. For example, an incremental scale could comprise scale features/marks that define a periodic pattern and which can be used to generate a periodic signal at the readhead (e.g. when relative movement between the scale and the readhead takes place). The scale can be elongate. The scale can comprise a substrate in and/or on which the features/markings are formed.

Optionally, the encoder apparatus is a diffraction-based encoder apparatus. Optionally, the scale comprises features configured to diffract light, which is then used to form a resultant signal on a sensor in the readhead assembly. Optionally, the readhead assembly comprises one or more optical elements configured to interact with light before and/or after the scale in order to form the signal on a sensor in the readhead assembly. Optionally, the readhead assembly comprises one or more lenses and/or one or more diffraction gratings. Optionally, the readhead assembly comprises a diffraction grating configured to interact with light from the scale to form an interference fringe on a sensor in the readhead assembly. Optionally, the sensor comprises an electrograting comprising two or more sets of interdigitated sensors, each set being configured to detect a different phase of an interference fringe.

Optionally, the scale comprises absolute scale features which define a (e.g. continuous) series of uniquely identifiable positions along the length of the scale.

Optionally, the readhead assembly is configured to detect an image of the scale. Optionally, the readhead assembly (e.g. the scale signal receiver) comprises at least one imaging optical element configured to form an image of the scale onto a sensor. Optionally, the readhead assembly comprises one or more sensors suitable for capturing an image, e.g. one or more Charge-Coupled Devices (CCD) or Complementary Metal-Oxide-Semiconductor (CMOS) sensors.

As will be understood, references to "optical" and references to "light" are intended to refer to electromagnetic radiation (EMR) in the ultraviolet to infra-red range (inclusive).

As will be understood, the readhead assembly can be configured to determine and output information concerning the relative position of the scale signal receiver and the scale (referred to herein as "position information"). Optionally, the readhead assembly comprises one or more processor devices configured to process the output from one or more sensors/detectors, e.g. so as to form said position information. The position signal can be incremental position information. For example, the position signal can comprise a quadrature signal. Optionally, the position signal comprises absolute position information. Said one or more processor devices could be located in the scale signal receiver and/or in another part of the readhead assembly (e.g. in the readhead mount).

As will be understood, the part outside of the protective housing to which the scale signal receiver is configured to be connected, could be part of a machine, the position/movement of which relative to another part of the machine (to which the scale is secured) is to be determined.

Since the arrangement of the scale signal receiver inside the protective housing is independent of the scale and protective housing, preferably the scale signal receiver is configured to be rigidly connected to said part outside the protective housing. The scale signal receiver can be configured to be connected to a part of a machine located outside the protective housing, e.g. via a mount member. Accordingly, the mount member could be a rigid mount member. Accordingly, said rigid connection/rigid mount member can be configured such that the position and orientation of the scale signal receiver within the protective housing, in all six degrees of freedom, can be dictated by (and mastered to) the part outside the protective housing to which the scale signal receiver is configured to be attached to. For example, in embodiments in which the readhead assembly comprises mounting features (described below), the position and orientation of the scale signal receiver within the protective housing, in all six degrees of freedom, can be dictated by (and mastered to) the mounting features (e.g. dictated by/mastered to a mounting block on which said mounting features are provided).

For example, the scale signal receiver can be rigidly fixed to a rigid readhead mount member which passes through the seal. Accordingly, the position and orientation of the scale signal receiver on the first side of the seal (inside the protective housing) can be dictated by (and mastered to) the readhead mount.

Said mount can be provided by the part of the machine to which the scale signal receiver is to be attached. For example, the machine itself could comprise a (rigid) mounting bracket that is inserted into the protective housing and connected to the scale signal receiver. Optionally, the readhead assembly can comprise a readhead mount comprising one or more mounting features located outside the protective housing for securing the readhead assembly to a part of a machine. As will be understood, the readhead assembly could be configured to be releasably fastened to a part of a machine. The one or more mounting features could be provided on a mounting block. A mounting feature could comprise, for example, a hole into and/or through which a releasable fastener (e.g. a bolt) can pass (and optionally engage). As will be understood, the scale signal receiver of the readhead assembly can be rigidly connected to the readhead mount (which as explained above can be rigid so as to ensure a rigid connection between the scale signal receiver and a part outside the protective housing). As will be understood, the scale signal receiver, readhead mount and blade could be formed as a single monolithic structure, or could comprise a plurality of separately formed units, rigidly connected to each other.

The mount could comprise a (rigid) blade-like member configured to extend through the seal. In those embodiments in which the readhead assembly comprises the readhead mount as described above, the blade-like member could extend through the seal between the scale signal receiver that is located inside the protective housing and the mounting features that is located outside the protective housing. The blade-like member could comprise first and second edges (in other words, leading and trailing edges). The blade-like member could be tapered towards the first and second edges. The blade-like member could comprise an internal passageway/channel for wires and/or air to pass through between the inside and outside of the protective housing, for example between the scale signal receiver and a mounting block on which the one or more mounting features are provided.

The protective housing can comprise one or more mounting features for mounting the protective housing to a part of a machine (e.g. to different part of the machine to which the scale signal receiver is configured to be mounted to, said parts of the machine being relatively movable with respect to each other). Said one or more mounting features could be configured to facilitate releasable mounting of the protective housing. A mounting feature can comprise a hole into and/or through which a releasable fastener (e.g. a bolt) can extend (and optionally engage).

The encoder apparatus could comprise a magnetic, inductive, capacitive, and/or optical encoder apparatus. Accordingly, the scale could comprise magnetic, inductive, capacitive, and/or optical scale. Optionally, the encoder apparatus comprises an optical encoder apparatus.

The scale can comprise rotary scale. The rotary scale can comprise what is commonly referred to as disc scale (in which the scale features are provided on the face of the disc). The rotary scale can comprise what is commonly referred to as ring scale (in which the scale features are provided on the circumferential edge of the disc). Optionally, the scale can comprise linear scale.

Optionally, the encoder module has a nominal ride-height of not less than 0.1 mm, for example not less than 0.2 mm, for instance not less than 0.5 mm. Optionally, the encoder apparatus has a nominal ride-height of not more than 5 mm, for example not more than 2 mm, for instance not more than 1 mm. Optionally, the allowable ride-height variation ("tolerance") for the encoder module is not less than +/−50 μm (microns), optionally not less than +/−75 μm (microns), for example at least +/−100 μm (microns).

The protective housing can be elongate. The protective housing can be substantially straight. The protective housing can comprise a substantially tubular form. The cross-sectional shape of said tubular protective housing need not necessarily be round, but for example could comprise other regular or irregular shapes. For example, the cross-section shape of said tubular protective housing could be substantially rectangular.

Said seal could be provided on a first side-wall of the protective housing. Optionally said seal is provided along an edge between two side-walls of the protective housing. Said seal could be substantially elongate. The seal can extend along the encoder apparatus' measurement dimension. Optionally, the seal is provided by a flow of gas, e.g. across a gap in the protective housing, and/or for example via a positive (e.g. air) pressure inside said protective housing. Optionally, the seal comprises a physical barrier. The seal could comprise a plurality, for example a pair, of seal members. For example, the seal could comprise a plurality (e.g. a pair) of sealing lips (e.g. which could be elongate or annular/ring-shaped). The member which connects the scale signal receiver to the part outside the protective housing could pass through the seal, e.g. between the sealing lips. For example, the above mentioned blade-like member could pass through the seal, e.g. between the sealing lips.

Optionally, the seal (e.g. the sealing lips) is (are) compliant. Optionally, the seal (e.g. the sealing lips) is (are) elastic. For example, the seal (e.g. the sealing lips) is (are) sufficiently compliant so as to enable the relative movement of the scale/protective housing and the scale signal receiver (in particular by permitting the member, e.g. blade-like member, and the protective housing/seal to move relative to each other). Optionally, the seal (e.g. the sealing lips) is (are) biased toward a sealed configuration, e.g. by way of their elasticity. The seal (e.g. the sealing lips) could comprise, for example, polyurethane, such as thermoplastic polyurethane, and/or fluorinated elastomer.

The readhead assembly can comprise at least one vibration control device. As will be understood, such one or more vibration control devices can be configured to reduce the susceptibility of the of the readhead assembly (e.g. of the scale signal receiver) to vibrations. A vibration control device can be a device configured to reduce the response of at least part of a system (e.g. of the scale signal receiver of the readhead assembly) due to external excitation. The at least one vibration control device can comprise at least one member which is configured to vibrate independently of the readhead assembly, e.g. independently of the scale signal receiver. As will be understood, the vibration control device can be configured to take energy out of a vibrating readhead assembly/scale signal receiver. Optionally, the vibration control device is configured such that the resonance magnification factor (also known as amplification factor) of the readhead assembly/scale signal receiver is less than 50, for example less than 20, for instance less than 10.

The at least one vibration control device can comprise at least one member which is configured with a resonant frequency independent of the parts of the readhead assembly that are located inside the protective housing (e.g. of the scale signal receiver). Optionally, the at least one vibration control device comprises at least one member which is configured with a resonant frequency different to that of the parts of the readhead assembly that are located inside the protective housing (e.g. different to that of the scale signal receiver). The vibration control device can be associated with (e.g. coupled or connected to) only a single unitary/movable body (i.e. is not located between two independently moveable bodies). Accordingly, the vibration control device could be in contact with only a single unitary/movable body.

The at least one vibration control device could comprise a linear vibration control device. For example, it can comprise linear spring stiffness. The at least one vibration control device could comprise a non-linear vibration control device. For example, it can comprise non-linear spring stiffness.

The at least one vibration control device can be configured to control vibrations in at least one degree of freedom, optionally in a plurality of degrees of freedom, for example in at least one linear degree of freedom and at least one rotational degree of freedom. The at least one vibration control device can be configured to control one or more modes of vibration. For example, in the case of a tuned mass damper, the tuned mass damper can be tuned to multiple different resonant frequencies.

The at least one vibration control device can be configured to have a mass which is at least 1% of the mass of the part of the readhead assembly which it is configured to control vibration of, optionally at least 2% of the mass of said part, for instance at least 3% of the mass of said part. The vibration control device can be configured to have a mass which is not more than 30% of the mass of said part, optionally not more than 25% of the mass of said part, for example not more than 20% of the mass of said part, for instance not more than 10% of the mass of said part. As will be understood, said part can comprise the part of the readhead assembly that vibrates in excess of the source vibration. For example, said part can be the part of the readhead assembly which vibrates relative to the readhead mount. For instance, said part can be that part/those parts of the readhead assembly which is/are located inside the protective housing. For example, said part can comprise the scale signal receiver.

The scale signal receiver and/or the member via which the scale signal receiver can be attached to the part outside the protective housing (e.g. the readhead mount, in particular for example the blade-like member) could comprise at least one vibration control device.

The at least one vibration control device could be located inside the protective housing (e.g. on the scale signal receiver and/or the part that extend through the seal such as the blade-like member). For example, the scale signal receiver could comprise the at least one vibration control device. The vibration control device can reside within the scale signal receiver. In particular, in embodiments in which the scale signal receiver comprises an outer case (as explained in more detail below), the vibration control device can reside within said outer case (e.g. such that it is sealed from contamination). The vibration control device can reside within a void, e.g. a recess, for example a hole, provided by the scale signal receiver (e.g. provided by said outer case). The vibration control device can be configured so as to be able to move (e.g. vibrate) within said void/hole independently of the rest of the scale signal receiver/outer case. Optionally, the vibration control device could be provided on the outside of the scale signal receiver/outer case.

The at least one vibration control device can comprise one or more spring elements. The at least one vibration control device can comprise one or more damper elements. Accordingly, the at least one vibration control device can comprise a vibration damping device. At least one of the one or more spring elements and at least one of the one or more damper elements can be provided by a common/single/composite element, e.g. a spring damper element. A spring damper element can comprise an elastomer (e.g. rubber).

As will be understood, a damper element can comprise something that converts movement/motion energy into a different form, such as heat. Non-limiting examples of damper element include, for example, a viscous deformable element (e.g. such as an elastomer material) or for example two separate rigid or elastic elements configured to rub against each other when exposed to vibrations.

The vibration control device can comprise a mass element. The mass element could be separate to the spring and/or damper element. As explained above, the mass element could be configured to have a specific mass with respect to the part of the readhead assembly which it is configured to control vibration of. At least one of the one or more spring elements, at least one of the one or more mass elements, and at least one of the one or more damper elements can be provided by a common/single/composite element, e.g. a spring mass damper element. For example, an elastomeric block.

The vibration control device can comprise at least one elastomeric element. For example, at least one elastomeric ring. Said elastomeric element could be mounted on a body of higher density than the elastomeric element.

The vibration control device can comprise a tuned mass damper. The tuned mass damper can be tuned so as to reduce the amplitude of vibrations in at least the part of the readhead assembly (e.g. of at least the scale signal receiver) in which it is installed, at and around that part's resonant frequency. A tuned mass damper can comprise at least one spring element. A tuned mass damper can comprise at least one damper element. A tuned mass damper can comprise at least one mass element. The at least one spring's stiffness "k", the at least one damper's damping coefficient "c" and the at least one mass's mass "m" can be selected (in other words "tuned") so as to reduce the amplitude of vibrations of at least the part of the readhead assembly (e.g. of at least the scale signal receiver) in which it is installed, at and around that part's resonant frequency.

A plurality of vibration control devices can be provided. As will be understood, different vibration control devices could be configured differently so as to reduce the amplitude of different resonant frequencies. For example, different spring stiffness and/or different masses could be used. In those embodiments in which a damper element is also provided, different damping coefficients could be used.

The encoder apparatus (e.g. a sealed encoder module) can be configured to determine and output diagnostic information. As will be understood, the encoder apparatus/module (e.g. the readhead) can also configured to determine and output information concerning the relative position of the scale and readhead (and hence the relative position of first and second parts of a machine on which the encoder apparatus can be mounted) in a measuring dimension/degree of freedom (which could be linear or rotary for example). The diagnostic information could be indicative of the relative arrangement of the scale and the scale signal receiver, in particular in at least one dimension/degrees of freedom other than that of the measuring dimension/degree of freedom of the encoder module. Accordingly, the diagnostic information could be dependent on the relative arrangement of the scale and the scale signal receiver, in particular in at least one dimension/degrees of freedom other than that of the measuring dimension/degree of freedom of the encoder module. The sealed encoder module can be configured to determine and output diagnostic information regarding a scale signal detected by the readhead. The scale signal could be the signal detected by one or more sensors (e.g. in the readhead) that are configured (and in use, used) to detect the scale so as to determine said measure of the relative displacement of first and second parts of the machine (in the measuring dimension/degree of freedom). The scale signal could be the detected signal from the scale that is used to determine said measure of the relative displacement of first and second parts of the machine. The scale signal could be an incremental scale signal. Accordingly, the diagnostic information could be determined from the output of an incremental signal sensor of the readhead. The incremental scale signal could be an interference fringe. The scale signal could be a reference mark signal. Accordingly, the diagnostic information could be determined from the output of a reference mark signal sensor of the readhead. The scale signal could be an absolute scale signal. The scale signal could be an image of the scale (e.g. a one dimensional or two dimensional image of the scale). Accordingly, the diagnostic information could be determined from the output of an image sensor of the readhead. In other words, the diagnostic information could be determined from an image (e.g. a one or two dimensional image) of the scale.

Optionally, the scale signal used to determine diagnostic information is not the signal that is used to determine said measure of the relative displacement. Optionally, the scale signal from which diagnostic information is determined is detected by at least one sensor other than the sensor(s) the output of which is(are) configured to be used to determine said measure of the relative displacement of first and second parts of the machine. Such a sensor could be referred to as a "diagnostic sensor". Accordingly, in other words, the encoder module could be configured such that output of the diagnostic sensor is not used to determine said measure of the relative displacement of first and second parts of the machine.

Accordingly, as explained in more detail below, the scale signal detected by the readhead could be dependent on the relative arrangement of the scale and the scale signal receiver in at least one dimension/degree of freedom other than that of the measuring dimension/degree of freedom of the encoder module. As will be understood, the encoder module (e.g. the readhead) is also configured to determine and output information concerning the relative position of the scale and readhead (i.e. position information, that is in the measuring dimension/degree of freedom). Accordingly, the encoder apparatus/module can be configured to determine and output both position and diagnostic information. Accordingly, the encoder apparatus (e.g. the sealed encoder module) can comprise at least one processor configured to determine said diagnostic information.

As mentioned above, the diagnostic information could be dependent on (and hence indicative of) the relative arrangement of the scale and the scale signal receiver, in particular in at least one dimension/degree of freedom other than that of the measuring dimension of the encoder module. For example, the diagnostic information could be dependent on (and hence indicative of) any one, any combination, or all, of the scale and scale signal receiver's lateral position, ride-height, pitch, roll or yaw, with respect to each other. Accordingly, for example, the diagnostic information could be dependent on (and hence indicative of) when the scale and the scale signal receiver are, or are not, in a desired relative arrangement in at least one degree of freedom other than that of the measuring dimension. Such arrangement information can be particularly useful for those embodiments which have a scale signal receiver which is arranged independently of the scale, as described in more detail below.

As will be understood, the encoder apparatus/module could be configured such that the diagnostic information determined and output can comprise information concerning the quality of the scale signal detected by the readhead. The diagnostic information could provide a measure of the suitability of the representation to provide position information; and in particular for example reliable and/or accurate position information.

Outputting said diagnostic information could comprise providing an output based at least in part on at least one parameter determined as a result of a process configured to analyse the quality of the scale signal. For example, the control of an output device, such as a visual output device, can be based on said at least one parameter. Optionally, the encoder apparatus/module is configured to output diagnostic information in the form of one or more human-detectable signals. The encoder apparatus (e.g. the sealed encoder module) could comprise at least one output device for outputting said diagnostic information as a human-detectable signal. Said output device can output a signal indicative of said diagnostic information. Said output device could comprise a visual output device. Said output device could be configured to emit an optical signal. Optionally, the least one output device is provided on said readhead. Optionally, said at least one output device is provided on said protective housing. As described in more detail below, the readhead could comprise a mounting block external to said protective housing for mounting the readhead to one of first and second moveable parts of a machine, and said output device can be provided on said mounting block.

The scale signal receiver can comprise an outer case. The outer case can be configured to protect components of the scale signal receiver that are located inside the protective housing from contamination (e.g. solid or fluid such as swarf or coolant, or for example moisture) that does happen to enter the protective housing. In particular, the outer case can be configured to provide protection against fluid, for example, liquid. This can improve the reliability and longevity of the encoder apparatus. Said outer case could encapsulate said components. Said components can comprise electrical components, including any wires and/or any printed circuit boards. Said components can comprise the above described components which are configured to interact with the scale signal. The outer case can be a sealed body, for example a hermetically sealed case.

Accordingly, the sensor componentry of the scale signal receiver can be contained within a sealed body/outer case. In other words, the scale signal receiver's electrical and/or other componentry used, for example in the detection of the scale signal, can be contained within a sealed body/outer case. For example, in the case of an optical encoder apparatus, optical components such as a lens, diffraction grating, beam-steering device or beam-divider can be contained with the sealed body/outer case. The readhead's emitter (e.g. a light emitter) can be contained within the sealed body/outer case. A window (e.g. sealed window) in the sealed body/outer case can be provided for permitting the scale signal to enter the sealed body/outer case.

The outer case can be a rigid case. Such a rigid case can be configured to protect the one or more components, (including any wires and/or any printed circuit boards) against solid objects which enter the protective housing. The outer case could be substantially box-like. For example, it could have a generally rectangular cross-sectional profile. The outer case can provide a void/internal volume within which the one or more components of the scale signal receiver are located. The outer case can provide the structure (e.g. load bearing structure) to which one or more components of the scale signal receiver are mounted. The outer case can be (can be configured to be) mounted to one of the first and second parts of the machine. This could be via the protective housing. This could be via a readhead mount, e.g. as described above in connection with the other aspects of the invention. For example, the outer case could be mounted to one of the first and second parts of the machine via a mounting block. In embodiments in which the protective housing comprises a seal through which the scale signal receiver can be connected to a part outside the protective housing, the outer case can comprise the part which extends through the seal. For example, in embodiments in which there is a blade-like member (as described above), the blade-like member can be part of the outer case. In particular, the blade-like member can contain and protect wires or other electrical/optical components from contamination which enters the protective housing.

As will be understood, the outer case can comprise a plurality of components, e.g. a body and a lid, which together define an internal volume within which the one or more components of the readhead are contained.

The outer case can encapsulate at least all of the electronic components, including any wires and any printed circuit boards, of the scale signal receiver which are located within the protective housing. In the case of an optical encoder, the outer case could encapsulate all of the optical components used in the detection of the scale signal (e.g. any combination of one or more lenses, diffraction gratings, beam splitters, light sources, and beam steerers), except for an outer-side of one or more windows through which the scale signal enters the casing and/or through which light from a light emitter exits the outer case toward the scale. Accordingly, as will be understood, any such windows can form part of the outer case. Optionally, any electronic component that comprises a protective shell or body (e.g. which shields the bare electronics of the electronic component) can itself form part of the outer case.

The encoder apparatus could comprise a reflective optical encoder apparatus. In such embodiments the light source for illuminating the scale and the detector for detecting the scale can be located on the same side of the scale. In such embodiments, the same (e.g. a single) outer case can comprise the light source and the detector.

Preferably the outer case provides solid particle protection to at least level 4, and liquid ingress protection to at least level 4, according to the International Protection Marking (also known an Ingress Protection Marking), International Electrotechnical Commission (IEC) standard 60529. In other words, preferably the outer case has an IP rating of at least IP44. The outer case could provide solid particle protection to at least level 5, optionally to at least level 6. The outer case could provide liquid ingress protection to at least level 5, optionally to at least level 6, for instance to at least level 7. In other words, the outer case could have an IP rating of IPxy where x (which relates to solid particle protection) is at least 4 (e.g. 4 to 6) and y (which relates to liquid ingress protection) is at least 4 (e.g. 4 to 7).

This application describes a sealed encoder module for mounting onto a machine so as to measure relative displacement of first and second parts of the machine. As described the sealed encoder module can comprise, a scale, a readhead comprising a scale signal receiver, and a protective housing which encapsulates at least the scale and said scale signal receiver. As described, the scale signal receiver can comprise an outer case within which components of the scale signal receiver are contained. According to a second aspect of the invention there is provided an encoder apparatus comprising a scale and a readhead assembly moveable relative to each other, the scale and at least a scale signal receiver of the readhead assembly being located within a protective housing which is configured to protect them from contamination located outside the protecting housing and comprises a seal through which the scale signal receiver can be connected to a part outside the protective housing. The scale signal receiver can comprise an outer case within which components of the readhead are contained and protected from any contamination present inside the protective housing. As explained above, the outer case could be hermetically sealed. Providing the scale signal receiver with an outer case can help to ensure that one or more components of the scale signal receiver (i.e. component(s) for effecting the detection of the scale signal, e.g. electronic components and/or other components used for generating and/or interacting with, such as sensing and/or manipulating, the signal from the scale) is/are protected even if contamination does manage to get inside the protective housing. This can improve the reliability and longevity of the encoder apparatus. Such a component can comprise an electronic component. Such a component can comprise a sensor. Such a component can comprise a component which interacts with the scale signal (e.g. used to manipulate the signal from the scale before it is sensed by the readhead's sensor). Such a component can comprise an emitter, such as a light emitter, e.g. for illuminating the scale. In the case that the encoder apparatus comprises an optical encoder apparatus, the scale signal receiver's optical components can also be located inside said outer case. As will be understood, features explained above and below in connection with the other aspects of the invention are equally applicable to this aspect of the invention, and vice versa.

According to a third aspect of the invention there is provided a readhead assembly for an encoder apparatus (e.g. comprising at least one sensor for sensing scale features) comprising at least one vibration control device configured to reduce the susceptibility of at least a part of the readhead assembly (e.g. a scale signal receiving part) to vibrations. Accordingly, this application describes a readhead for an encoder apparatus comprising at least one sensor for sensing scale features and at least one vibration control device configured to vibrate independently of the rest of the readhead. Providing a readhead with at least one vibration control device can control vibrations transferred through to it from the machine on which it is mounted. This is particularly useful where the readhead is mounted to the machine via a structure that is susceptible to vibration (e.g. via an elongate member). Optionally, the encoder apparatus comprise a sealed encoder apparatus. This need not necessarily be the case; for example the encoder apparatus could comprise an open/exposed encoder apparatus. As will be understood, features explained above and below in connection with the other aspect of the invention are equally applicable to this aspect of the invention, and vice versa. Accordingly, for example, the readhead could comprise a scale signal receiver. The scale signal receiver could comprise the at least one vibration control device. In those embodiments in which the scale signal receiver is mounted via elongate blade, the scale signal receiver and/or elongate blade could comprise at least one vibration control device.

According to a fourth aspect of the invention there is provided a machine comprising an encoder apparatus and/or readhead as described herein.

According to another aspect of the invention there is provided an encoder apparatus, substantially as described herein and/or with reference to FIGS. 2 to 9.

According to a yet further aspect of the invention, there is provided, a sealed encoder module for mounting onto a machine so as to measure relative displacement of first and second parts of the machine. The sealed encoder module can comprise a scale, a readhead comprising a scale signal receiver and an integral protective housing which encapsulates at least the scale and said scale signal receiver. The sealed encoder module can be configured to determine and output diagnostic information regarding a scale signal detected by the readhead. As will be understood, the encoder module (e.g. the readhead) can also be configured to determine and output information concerning the relative position of the scale and readhead. Accordingly, the encoder module can be configured to determine and output both position and diagnostic information. As will be understood, features explained above and below in connection with the other aspects of the invention are equally applicable to this aspect of the invention, and vice versa.

Accordingly, this application describes, an encoder apparatus comprising a scale and a readhead moveable relative to each other, the scale and a scale signal receiver of the readhead being located on a first side of a seal so as to protect them from contamination present on a second side of the seal, the scale signal receiver being rigidly fixed to a rigid readhead mount which passes through the seal. Accordingly, the position and orientation of the scale signal receiver on the first side of the seal can be dictated by (and mastered to) the readhead mount.

Embodiments of the invention will now be described, by way of example only, with reference to the following drawings, in which:

FIG. 1a schematically illustrates a prior art sealed encoder;

FIG. 1b schematically illustrates the prior art sealed encoder of FIG. 1a with part of the protective housing cut-away to show the scale and scale sensor assembly located inside the protective housing;

FIG. 1c is a cross-section through the sealed encoder apparatus of FIG. 1a;

FIG. 1d schematically illustrates the prior art sealed encoder of FIG. 1a with part of the protective housing cut-away to show the scale and scale sensor assembly located inside the protective housing;

FIGS. 2a and 2b are schematic illustrations of a sealed encoder apparatus according to the present invention, with part of the protective housing cut-away to show the scale and scale signal receiver located inside the protective housing;

FIGS. 6a and 6b illustrate an alternative way of implementing a vibration control device on a readhead assembly;

Figure 8A:
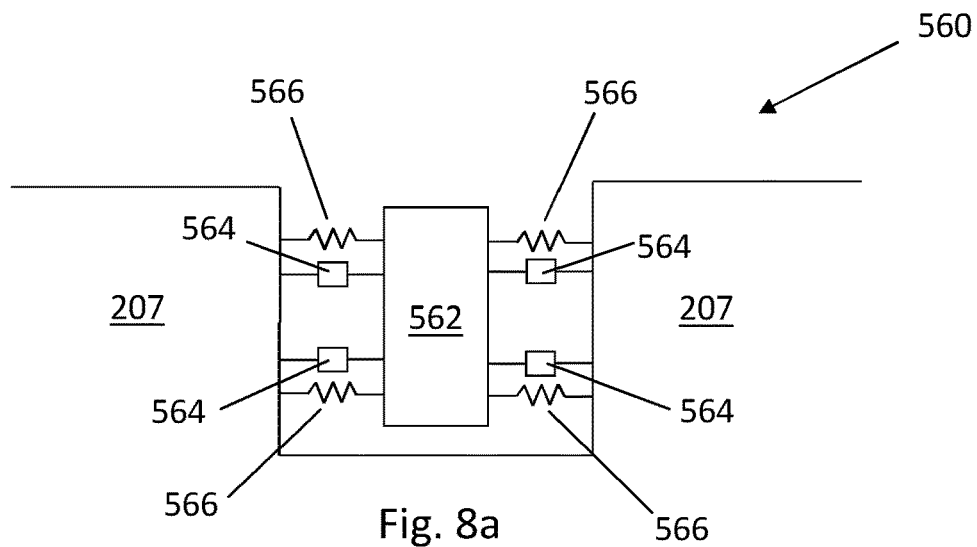
Figure 8B:
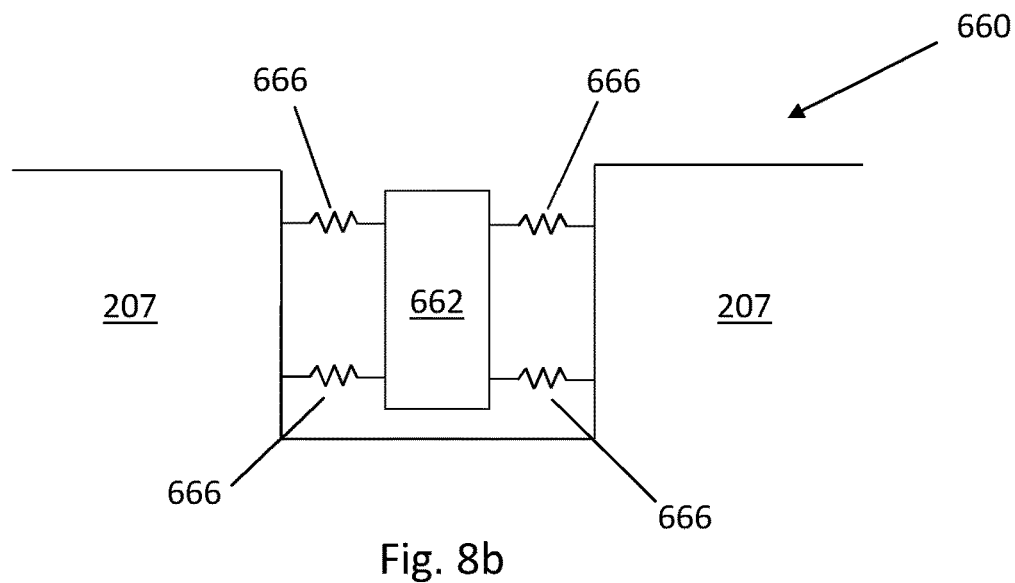
Figure 8C:
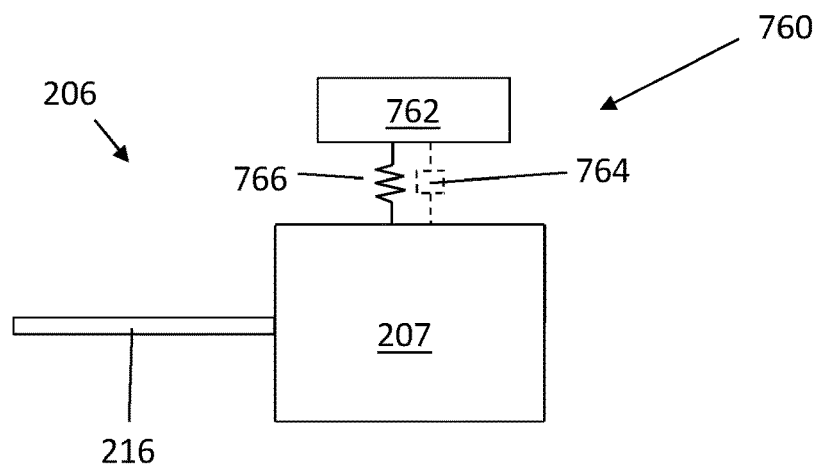
Figure 9A:
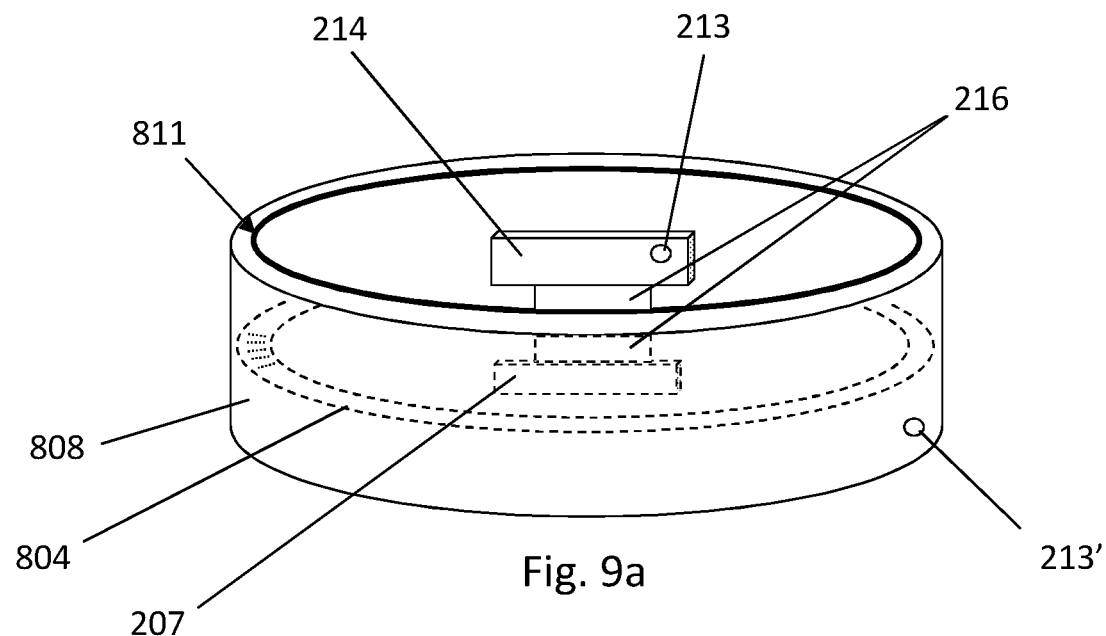
Figure 9B:
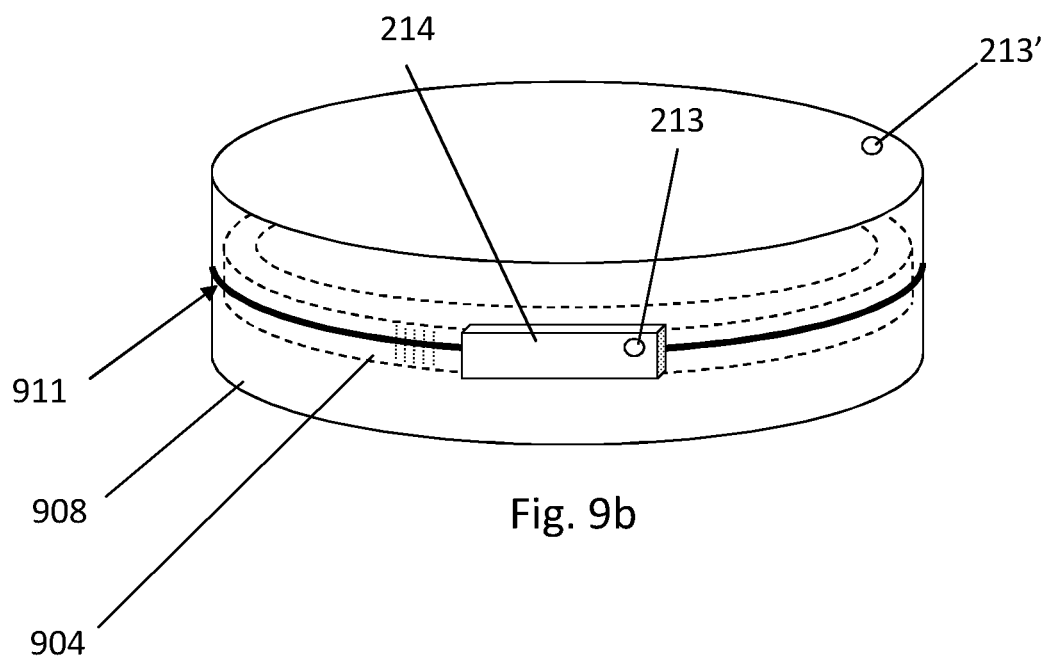

FIGS. 8a to 8c schematically illustrate further ways of implementing a vibration control device; and FIGS. 9a and 9b schematically illustrate rotary embodiments of the invention.

Referring to FIGS. 2a to 2d there is a sealed encoder module 102 according to the invention. The sealed encoder module 102 comprises a scale 104 having a plurality of features (not shown) and a readhead assembly 103, comprising a scale signal receiver 106 for receiving a signal from the scale. In the embodiment described the sealed encoder module 102 is an optical encoder, in that the readhead assembly 103 utilises electromagnetic radiation (EMR) in the infra-red to ultraviolet range in order to read the scale 104. In particular, in this described embodiment, the position measurement encoder apparatus is an optical absolute encoder. Accordingly, the scale comprises a continuous series of uniquely identifiable features, e.g. codes, which the readhead assembly 103 can read and process to determine a unique position along the length of the scale 104. However, as will be understood, the position measurement encoder apparatus need not necessarily be an absolute encoder. For example, it could be an incremental optical encoder. Furthermore, the encoder apparatus need not be an optical encoder, for example, the encoder apparatus could be a magnetic encoder, or for instance an inductive encoder.

The readhead assembly 103 communicates with an external processor device (not shown), e.g. a controller, via a communications channel which in the described embodiment comprises a physical connection (e.g. cable 105) as opposed to a wireless connection. The communication channel can be two-way such that the readhead assembly 103 can receive data (e.g. instructions) from the external processor device as well as send data (e.g. position information/signals) to the external processor device. Power to the readhead assembly 103 can also be supplied via a physical connection, e.g. via the cable 105. However, this need not necessarily be the case. For example, the readhead assembly 103 could comprise an internal power source such as a battery.

The scale 104 and scale signal receiver 106 are located inside a protective housing 108 which protects them from contaminants external to the protective housing. The scale 104 is fixed to the protective housing 108 whereas the scale signal receiver 106 can move along the length of the scale 104 within the protective housing 108. In use, the protective housing 108 will be secured to a first part of a machine (not shown) and the scale signal receiver 106 will be secured to a second part of the machine (not shown). As will be understood, the first and second parts of the machine are relatively moveable with respect to each other. The readhead assembly further comprises a mounting block 114 which is to be directly fastened to the second part of the machine (e.g. via one or more releasable fasteners, such as threaded bolts passing through holes 115), and a blade 116 which is connected to and extends between the mounting block 114 and the scale signal receiver 106. A light source 113 is provided on one end of the mounting block 114 and is used (as explained in more detail below in connection with the other embodiments of the invention) to relay diagnostic information concerning the encoder to an operator/installer.

The protective housing 108 further comprises a seal 111 in the form of a pair of sealing lips 112 which seals the inside of the protective housing 108, in which the scale 104 and scale signal receiver 106 reside, from external contaminants. The blade 116 passes between the pair of sealing lips 112. The sealing lips 112 are compliant so as to be able to part so as to allow the movement of the blade 116 and hence the scale signal receiver 106 along the length of the protective housing 108 and hence the scale 104, but are also sufficiently elastic so as to close together around the blade 116, thereby forming a physical barrier to solid and fluid (in particular liquid and moisture) contaminants. In other words, the blade 116 prises the sealing lips 112 apart as it moves along the length of the seal, between the sealing lips 112, and the sealing lips have sufficient elasticity so as to close together in the absence of the blade 116.

Unlike the embodiment described above in connection with FIG. 1, in this case the arrangement of the scale signal receiver 106 within the protective housing is independent of the scale 104 or the protective housing 108. The scale signal receiver 106 is rigidly connected to the mounting block 114. In particular, scale signal receiver 106 is rigidly connected to the blade 116, which in turn is rigidly connected to the mounting block 114. Accordingly, the position of the scale signal receiver 106 in all degrees of freedom is dictated by the position of the mounting block 114 and hence dictated by the position of the second part of the machine to which the mounting block 114 is secured during use, and not by the scale 104 or other part inside the protective housing 108.

Accordingly, in contrast to the embodiment described in connection with FIG. 1, in the embodiment described the scale signal receiver's 106 position and motion is not constrained or guided in any way by the scale 104 or protective housing 108. Due to the rigid mount between the scale signal receiver 106 and the mounting block 114 the position and motion of the scale signal receiver 106 in all six degrees of freedom is constrained and guided by the position and motion of the mounting block 114, and hence the part of the machine to which the mounting block 114 is secured.

Accordingly, the position and motion of the scale signal receiver 106 could be described as being "externally constrained" (in contrast to the scale sensor assembly 6 of FIG. 1 in which the position and motion of the readhead 6 is "internally constrained"). Additionally/alternatively, the sealed encoder module 102 could be described as being a "bearingless" or as a "without integral bearing" encoder (in contrast to the encoder module 2 of FIG. 1 which could be referred to as an "integral bearing" encoder).

As will be understood, if desired, an adjustment mechanism could be provided for adjusting the relative set-up position of the scale signal receiver 106 with respect to the mounting block 114 (e.g. the scale signal receiver could be connected to the blade 116, and/or the blade 116 could be mounted to the mounting block 114, via a joint which facilitates selective adjustment of their relative position in at least one linear and/or one rotational degree of freedom, for example by manipulation of a micro/grub screw). Such a selective adjustment mechanism could be useful to aid set-up/alignment of the encoder apparatus. However, as will be understood, such a selective adjustment mechanism will still provide a rigid connection between the scale signal receiver 106 and the readhead mount 114, and hence a rigid connection between the scale signal receiver 106 and the part of the machine on which it is mounted (i.e. so that during use/operation, the position/orientation of the scale signal receiver 106 in all degrees of freedom is still mastered to/dictated by the second part of the machine to which the mounting block 114 is mounted).

In the described embodiment, the scale signal receiver 106 does not contact the scale 104, nor the protective housing 108 at all. Accordingly, there is a gap all the way around the scale signal receiver 106, between it and the scale 104 and the inside of protective housing 108. Indeed, as shown, in the embodiment described, the only contact between the readhead assembly 103 (which comprises the scale signal receiver 106 and the readhead mount 110) and the protective housing 108 is between the blade 116 and the pair of sealing lips 112. As will be understood, the pair of sealing lips 112 are flexible and elastic in behaviour and yield to accommodate the blade 116, and thereby do not constrain or control the position of the scale signal receiver 106.

Furthermore, in the embodiment described, the scale signal receiver 106 comprises an outer case 107, inside of which is located the scale signal receiver's electrical components. The scale signal receiver's 106 sensor for detecting the scale signal coming from the scale 104, and also any associated components for forming the scale signal on the sensor (e.g. optical components such as a lens, diffraction grating and/or mirrors) can also be provided inside the scale signal receiver's outer case 107. The outer case 107, is configured (e.g. sealed) such that if contamination did inadvertently pass through the lip seals 112, then the scale signal receiver's 106 components (in particular the electrical and optical components) inside the outer case 107 are protected.

As will be understood, in embodiments in which an outer case 107 is provided, a window (e.g. window 232 in FIGS. 3 and 4) can be provided to enable the scale signal to reach the sensor located inside the outer case 107. Optionally, the window has no material effect on the scale signal (e.g. its only purpose could be to merely allow the signal from the scale to enter the outer case 107 without contributing to the form of the signal received at the readhead's sensor). Optionally, the window could be configured to re-direct the signal coming from the scale (e.g. it could comprise a mirror). Optionally, the window could be configured to interact with the signal from the scale so as to produce the desired signal detected at the sensor. For example, it could comprise a diffraction grating, and/or lens. In any case, as will be understood, the outside of the window 232 will not be sealed from any contamination entering the protective housing 108, since it forms part of the outer case 107, but the inside of the window, and any other components (e.g. optical components) which are configured to manipulate the signal coming from the scale 104 are protected from contamination.

The benefits of providing the scale signal receiver 106 with an outer case 107 can be beneficial not just for embodiments in which the scale signal receiver 106 is independently arranged with respect to the scale 104/protective housing 108 (e.g. which is rigidly mounted and "externally constrained"), but can also be beneficial for "integral bearing" encoders (e.g. those embodiments in which the scale signal receiver is mounted to the readhead mount via an articulated linkage and the position of which is "internally constrained". For example, an outer case can also be beneficial in "integral bearing"/"internally constrained" enclosed encoders of the type described above in connection with FIG. 1. Accordingly, as will be understood, in connection with this aspect, there could be provided an articulated linkage such as that described in connection with FIG. 1. However, although providing an outer case 107 can improve the resilience such "integral bearing"/"internally constrained" enclosed encoders, if contamination does pass through the sealing lips 12 and lands on the scale, this can adversely affect the performance of the encoder apparatus. For example, if sufficient contamination landed on the scale features then this could adversely affect the signal coming from the scale. Also, if solid contamination such as swarf entered the protective housing and fell on the track(s) along which the readhead's bearings 20 run, this could adversely affect the relative position/orientation of the scale signal receiver and scale as the bearings between the scale and scale signal receiver rides over the dirt. Of course, an enclosed encoder with a scale signal receiver arranged independently of the scale (e.g. "externally constrained") has the additional benefit of not suffering from such a problem.

As explained in more detail below in connection with the other embodiments of the invention, the scale signal receiver 106 receives a signal from the scale which is processed in order to provide, via cable 105 for example, a position signal to an external device (such as a machine controller). For example, processing to determine the position could be performed by one or more processor devices in the scale signal receiver 106, and/or by one or more processor devices in another part of the readhead assembly such as the mounting block 114. Optionally, the blade 116 comprises one or more channels to enable wires to pass between the scale signal receiver 106 and the mounting block 114. Alternatively, wireless communication could be used, or wired connections external to the blade 116 could be used. If the blade 116 comprises one or more channels, then air (for example supplied via an air supply line 109) could be passed through to the inside of the protective housing 108 via the blade 116 (e.g. via holes in the blade 116).

As will be understood, FIGS. 2a to 2d are schematic and typically the separation between the scale 104 and scale signal receiver 106 (often referred to as the ride-height) can be much smaller than that shown. The desired ride-height will depend on the encoder, but for example, typical ride-heights for optical encoders can be in the region of 0.24 mm to 2 mm. In the particular example described, the nominal ride-height is 0.8 mm, with a +/−0.15 mm tolerance.

The sealed encoder module 102 shown in FIGS. 2a to 2d can be used in any orientation. In FIGS. 2a to 2d, the mounting block 114 is shown to be positioned directly above the scale signal receiver 106 and the protective housing 108. However, this need not necessarily be the case. For example, the sealed encoder module 102 could be mounted on its side, or even upside down (such that the mounting block 114 is positioned directly below the scale signal receiver 106 and the protective housing 108). Indeed, such an arrangement can be advantageous because any external contamination will tend to fall away from the lip seals 112 of the protective housing 108 due to gravity.

Figure 1A:
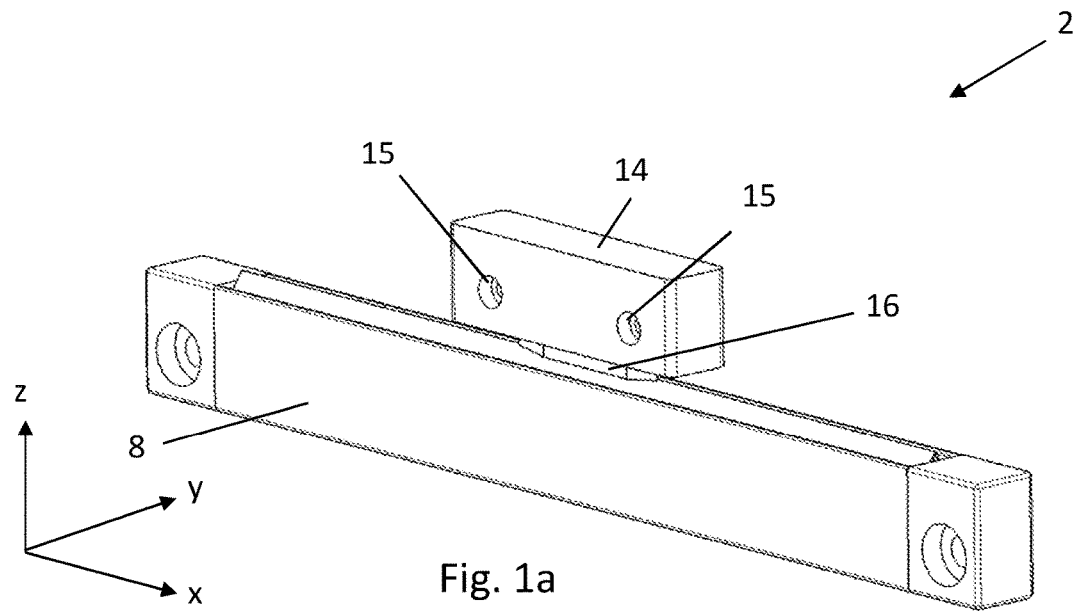
Figure 1B:
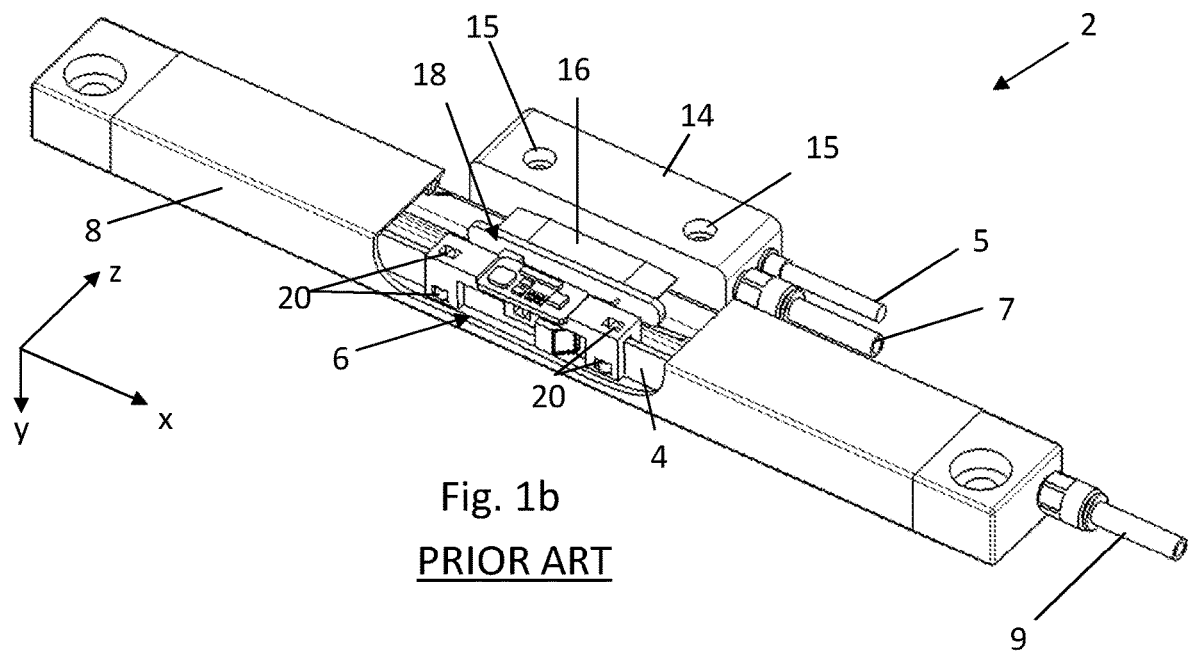
Figure 1C:
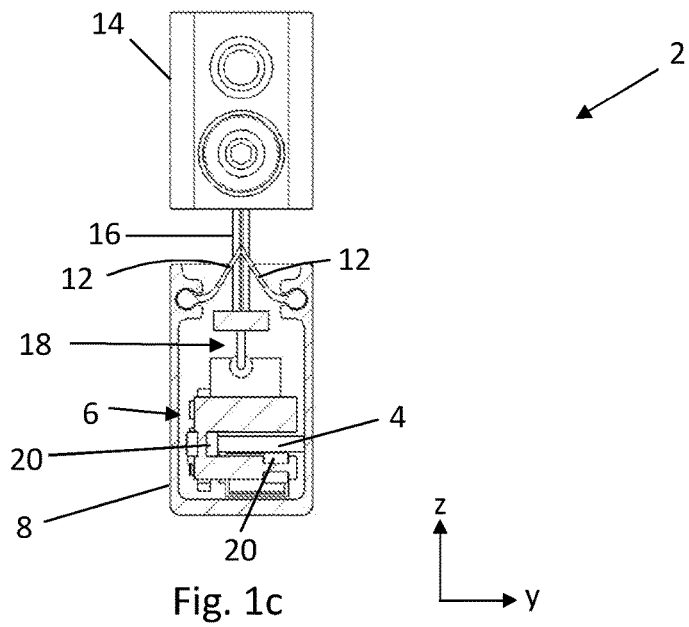
Figure 1D:
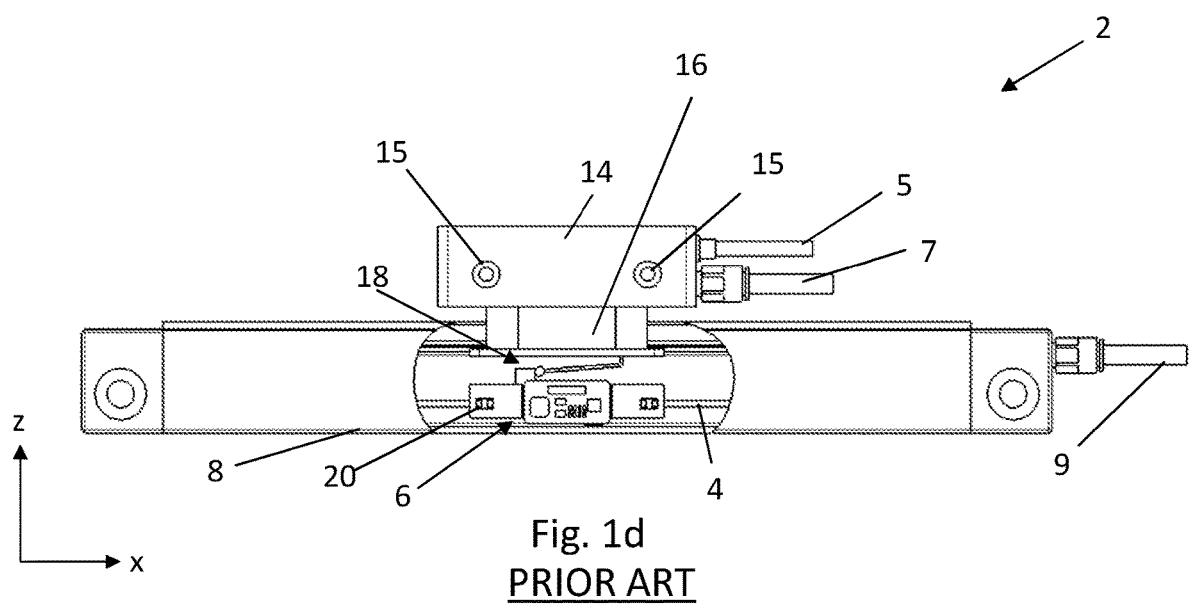
Figure 2C:
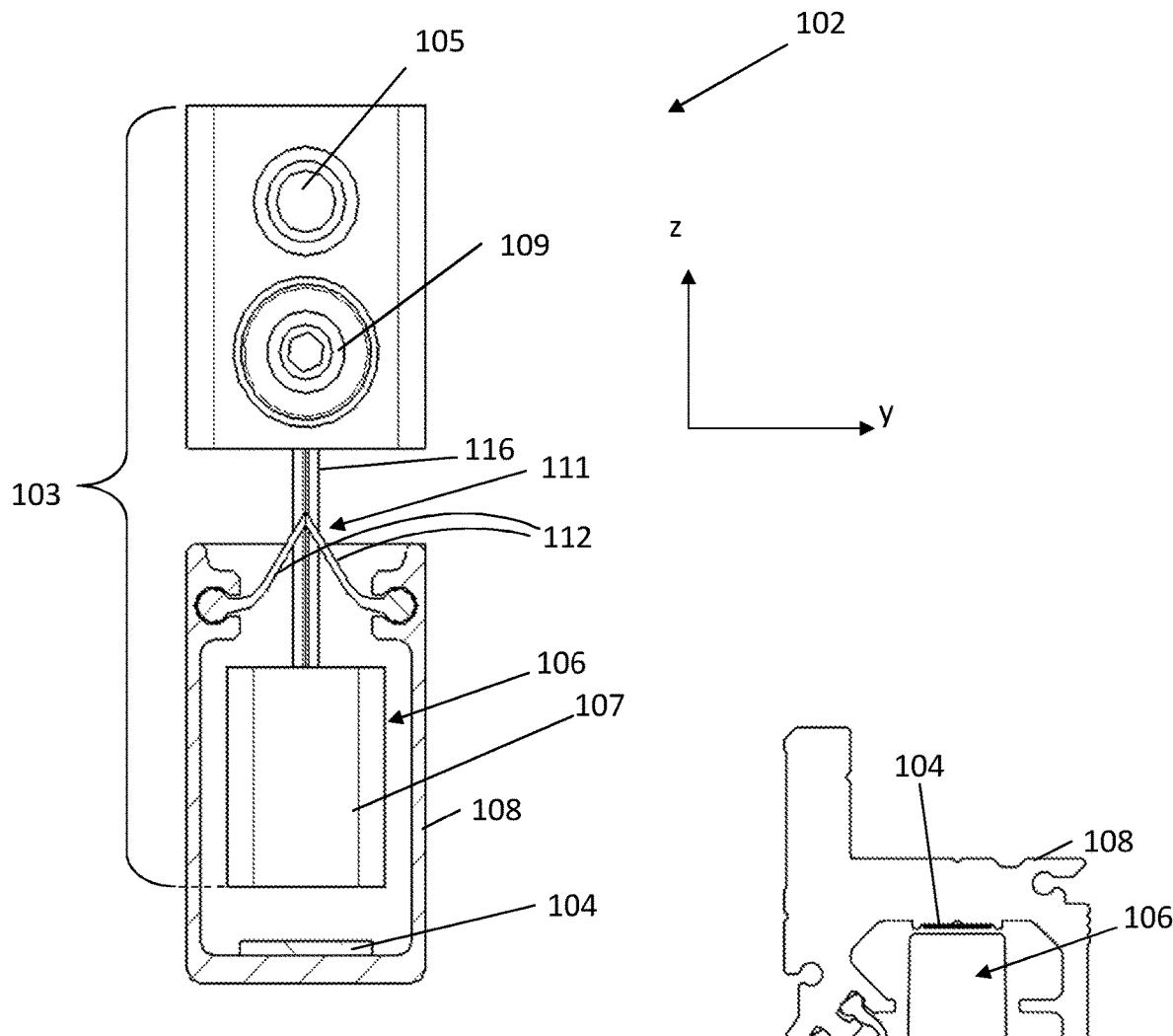
FIG. 2c is a cross-section through the sealed encoder apparatus of FIGS. 2a and 2b.
Figure 2D:
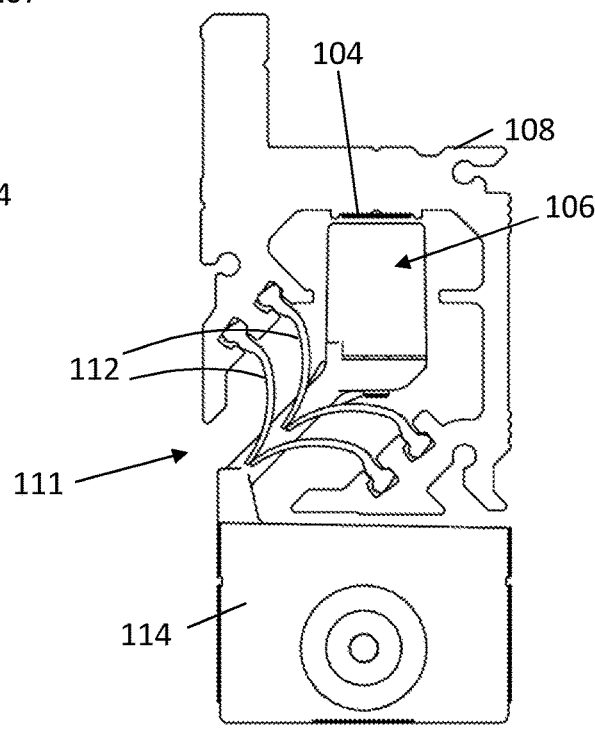
FIG. 2d is a cross-section through an alternative embodiment of an enclosed encoder apparatus.

Likewise, the pair of sealing lips 112 need not be provided directly on the side of the protective housing 108 that is opposite the side of the protective housing 108 on which the scale is located. For example, with reference to the orientation shown in FIG. 2c, the sealing lips 112 could be provided on one of the vertical sides of the protective housing such that the blade 116 extends horizontally as opposed to vertically. Alternatively, they could be provided along one of the corners/edges of the protective housing between two sides, such as shown in FIG. 2d (which as shown in this embodiment the seal 111 comprises two pairs of sealing lips 112).

Figure 3:
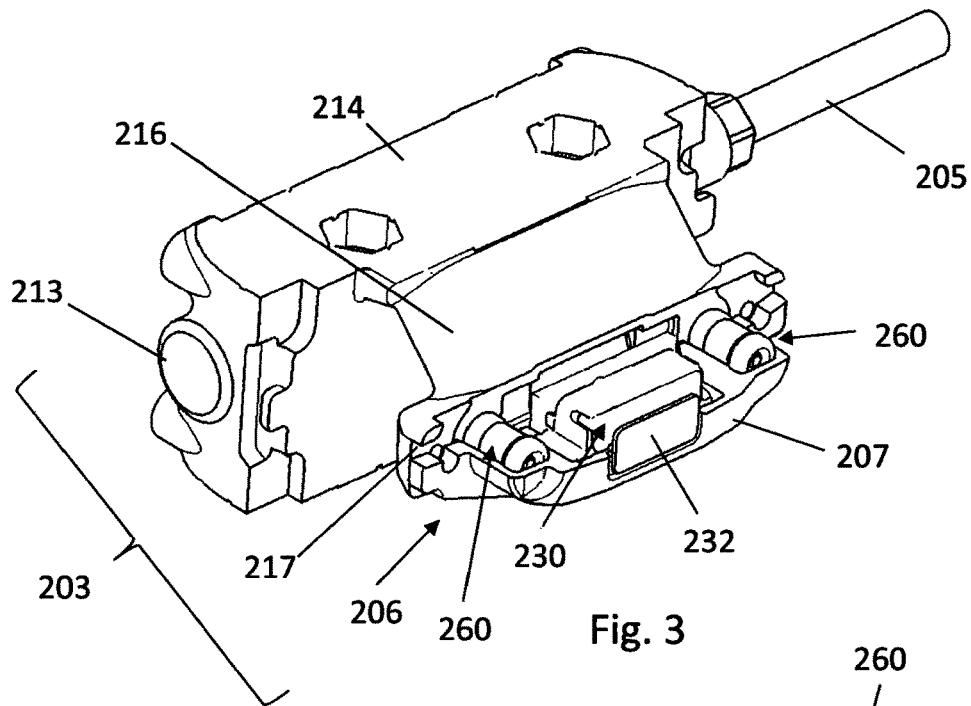
FIG. 3 is an illustration of an alternative embodiment of a readhead assembly suitable for use with a sealed encoder, with part of the signal receiving module cut-away to expose its internal components.
Figure 4:
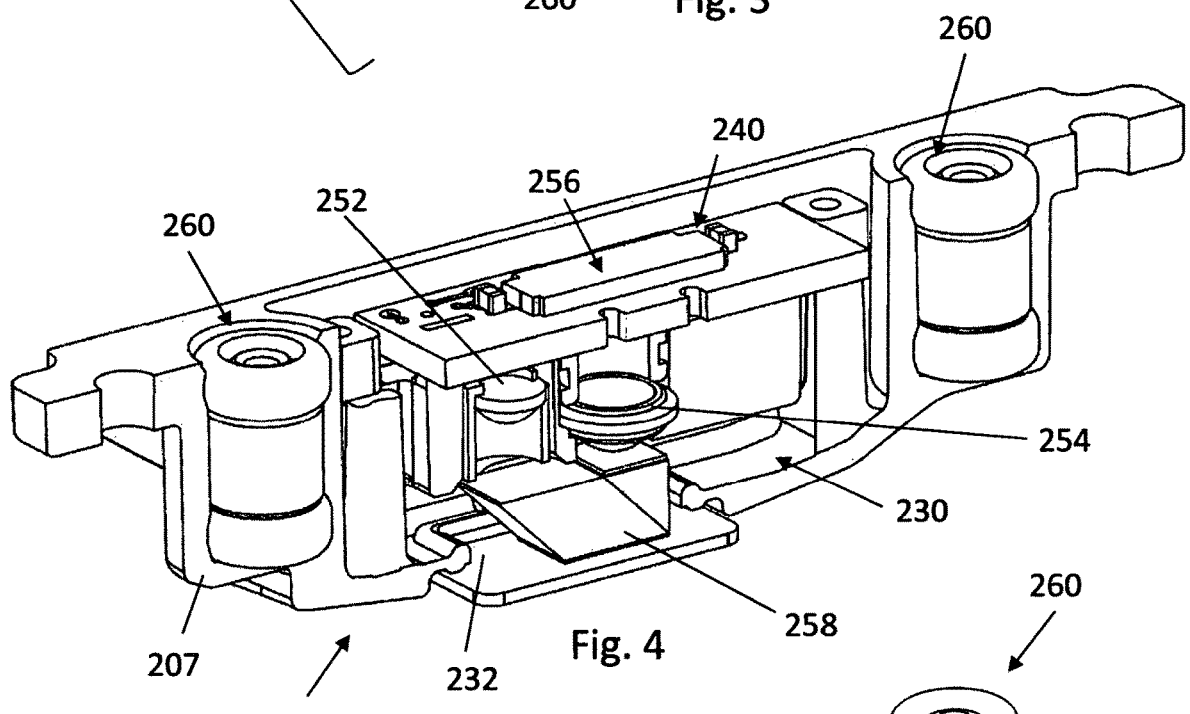
FIG. 4 is an illustration of the signal receiving module of the sealed encoder apparatus of FIG. 3.
Figure 5:
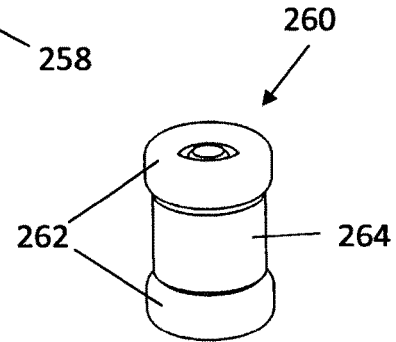
FIG. 5 is an illustration of a tuned mass damper used in the signal receiving module of FIGS. 3 and 4.

Referring now to FIGS. 3 to 5, there is shown another readhead assembly 203. The readhead assembly 203 of FIGS. 3 to 5 shares many similarities with the readhead assembly 103 of FIG. 2 and for instance comprises a scale signal receiver 206, a mounting block 214, a light emitter 213, and a blade 216 providing a rigid connection between the scale signal receiver 206 and the mounting block 214 (accordingly, the scale signal receiver 206 is "externally constrained"). FIG. 3 shows the readhead assembly 203 in isolation, but as will be understood the readhead assembly 203 is intended to be used to read a scale that is located inside a protective housing, like that shown in FIGS. 2a to 2d. Accordingly, it is also intended that the scale signal receiver 206 will also be located inside the protective housing, and the blade 216 will pass through an elongate seal in the protective housing, such as a pair of sealing lips. As with the embodiment of FIGS. 2a to 2d, the scale signal receiver 206 is an optical readhead, but this need not necessarily be the case.

As with the scale signal receiver 106 of FIG. 2, the scale signal receiver 206 of FIGS. 3 and 4 comprises a protective outer case 207. In this case, the components inside the scale signal receiver 206 are protected (e.g. sealed) by way of the protective outer case 207 and a mounting face 217 provided at the end of the blade 216 proximal the scale signal receiver 206 via which the scale signal receiver 206 is mounted to the blade 216. A sealing member can be provided at the interface between the outer case 207 and the mounting face 217 (e.g. a gasket could be sandwiched between the outer case 207 and the mounting face 217 of the blade 216).

As shown, rather than the blade 216 extending perpendicularly between the scale signal receiver 206 and the mounting block 214 (as in the configuration of FIG. 2), in this embodiment the blade extends at a non-perpendicular angle, for example approximately 45 degrees between the scale signal receiver 206 and the mounting block 214. This is such that the blade can be oriented such that any liquid falling on it will fall away from the sealing lips, regardless of whether the sealed encoder module is mounted vertically or horizontally.

As shown in FIGS. 3 and 4 there is shown an optical unit 230 comprising the scale signal receiver's components for detecting the scale signal. In particular, the optical unit comprises a light source 252 for illuminating the scale, a lens 254 configured to image the scale, a sensor 256 on which said image falls and is configured to detect said image (e.g. a one or two dimensional CCD or CMOS sensor), and a beam steerer 258 which is configured to direct light from the light source onto the scale. As shown, the sensor 256 can be mounted on a printed circuit board (PCB) 240. A cable (not shown) connects the PCB 240 to a processor device inside the mounting block 214. When an image is obtained by the sensor, it is passed to the processor device located inside the mounting block 214, which processes the image to determine a position (in a known manner, e.g. as explained in US2012072169, the content of which is incorporated herein by this reference). The determined position is then communicated to an external device (such as a machine controller for example), for example via one or more signals transmitted along cable 205. As will be understood, other arrangements are possible. For example, all processing could be performed by one or more processor devices located in the scale signal receiver 206. In another alternative embodiment, the sensor device (e.g. a CCD or CMOS) could be located in the mounting block and could receive the scale signal via a light guide (e.g. fibre optic) that extends through the blade 216. Accordingly, in this case the scale signal receiver 206 merely collects the signal/light from the scale and passes it through to a sensor located elsewhere in the readhead assembly.

As mentioned above, a light emitter 213 (113 in the embodiment of FIGS. 2a to 2d) for relaying diagnostic information can be provided by the encoder module; for example by the readhead assembly. Such a light emitter can be used to relay diagnostic information to an operator/installer. For example, the colour and/or brightness of light emitted by the light source controlled so as to replay diagnostic information. Optionally, the light emitter could be configured to flash in particular ways so as to relay diagnostic information.

For example, the light emitter could be controlled so as to emit a visual signal that is dependent on the relative set up of the readhead (e.g. scale signal receiver) and the scale. This could be particularly useful during installation of the encoder module so as to confirm that the readhead is receiving a good signal from the scale. For instance, the encoder module could be configured such that the colour of the light emitter 213 is dependent on the relative set up (e.g. green light could be emitted when the readhead is receiving a good/strong scale signal, and red light could be emitted when the readhead is receiving a poor/weak scale signal). Such a visual indication for indicating the relative set up of the readhead and scale can be useful for both "independently arranged" and "internally constrained" encoder apparatus. Such a visual indication for indicating the relative set up of the readhead and scale can be particularly useful when (as mentioned above) an adjustment mechanism is provided for adjusting the relative set-up position of the scale signal receiver with respect to the mounting block.

In the embodiment described, the processor inside the mounting block 214 that is used to determine a position is also configured to process the image detected by the sensor 256 in order to determine the diagnostic information (however as will be understood this need not necessarily be the case; a separate processor could be used). In the embodiment described, the processor is configured to determine diagnostic information based on the quality of the signal detected by the sensor. In this particular embodiment, it is configured to Fourier Transform the image obtained by the sensor at the fundamental spatial frequency, ω, of the scale's features (which could be provided during set up of the encoder module or by analysis of the image). The magnitude, A, of the Fourier transform is then established. As will be understood, a Fourier transform provides a real part $\Re$ and an imaginary part $\Im$, and the magnitude A can be calculated from the following equation:

$$A = \sqrt{[\Re_{(F(\omega))}]^2 + [\Im_{(F(\omega))}]^2} \text{ or } A^2 = [\Re_{(F(\omega))}]^2 + [\Im_{(F(\omega))}]^2 \quad (1)$$

where F(ω) represents the Fourier transform of the representation at spatial frequency ω

Since computing a square root is computationally intensive, it will be understood that it may be preferable to use $A^2$ instead of A to determine the setup indicator output. The method then comprises comparing the A (or $A^2$) to threshold values to determine how to control the light emitter 213. For example, when A (or $A^2$) has a value below a threshold then the light emitter can be controlled to output red light and when A (or $A^2$) has a value above a threshold then the light emitter can be controlled to output green light.

As will be understood, A (or $A^2$) is dependent on the amplitude of the features as obtained in the representation. This is in turn affected by the setup of the readhead relative to the scale (which is what is to be determined). A (or $A^2$) is also dependent on the number of features in the representation. Accordingly, if there is significant variation in the density of features along the scale, then the method can comprise steps to compensate for this. For example, this compensation may be achieved by dividing A (or $A^2$) by the number of features in the representation.

In the described embodiment, the method involves Fourier Transforming the representation substantially at the fundamental spatial frequency of the features. The Fourier Transform could use an assumed fundamental spatial frequency of the features, based on the scale that it is being used with. Even if the assumed fundamental frequency is not exactly correct, then the method can still provide a useful indication of the quality of the representation. Optionally, the fundamental spatial frequency of the features could be determined by analysing the image before performing the Fourier Transform. This could be useful in embodiments in which the actual fundamental spatial frequency of the features as imaged varies significantly due to rideheight/magnification effects.

Furthermore, as will be understood, it need not necessarily be the case that the Fourier Transform is performed substantially at the fundamental spatial frequency of the features. For instance, the method could involve performing the Fourier Transform at some other frequency, e.g. at a harmonic of the spatial frequency. Optionally, the method could involve performing the Fourier Transform at one or more frequencies and comparing the magnitude of the Fourier Transforms at the different spatial frequencies.

Additional details of how an image of an absolute scale can be processed to determine diagnostic information is described in U.S. Pat. No. 8,505,210, the content of which is incorporated herein by this reference. As will be understood, there are other ways in which the diagnostic information can be determined. For example, as described in U.S. Pat. No. 8,505,210, the relative amplitude of different types of scale features as imaged can be determined which can be indicative of the quality of the scale signal detected.

As shown, in this embodiment, the scale signal receiver 206 also comprises a vibration control device (in fact, this embodiment comprises a plurality of vibration control devices), which in this particular embodiment comprises a tuned mass damper 260. Our inventors have found the use of at least one vibration control device can improve the life and/or metrological performance of an encoder apparatus. This is particularly the case when the scale signal receiver is rigidly mounted to a structure via a member susceptible to vibration (e.g. a member which transmits and/or amplifies vibration) such as an elongate arm or a thin blade to which the scale signal receiver is rigidly mounted. For example, in the case of the "externally constrained" scale signal receiver of the embodiments described above, vibrations are passed through to the scale signal receiver via the rigid mounting arrangement. A vibration control device provides a way of controlling such unwanted vibration to which the scale signal receiver is exposed.

As will be understood, a vibration control device can be a device configured to reduce the response of a system (e.g. the scale signal receiver) due to external excitation. As mentioned above, in this particular example, the vibration control device comprises a tuned mass damper 260 which is tuned so as to reduce the amplitude of vibrations in the system in which it is installed, at and around the system's resonant frequency. As will be understood, a tuned mass damper comprises a spring, a damper and a mass. The spring's stiffness "k", the damper's damping coefficient "c" and the mass's mass "m" are selected (in other words "tuned") so as to reduce the amplitude of vibrations of the system in which it is installed, at and around the system's resonant frequency. In this embodiment, the tuned mass damper comprises a pair of elastomer rings 262 (for example rubber rings), which provides the spring and damper elements, and a body 264 which provides the mass element. Accordingly, each elastomer ring 262 acts as a spring and a damper, by way of absorbing energy and converting the energy to heat. The body 264 comprises a sufficiently dense material (e.g. brass) so as to enable the body 264 to have sufficiently small size whilst providing suitable high mass.

Typically, the mass of a tuned mass damper needs to be a substantial percentage of the mass of the system it is intended to damp (in this case the parts of the readhead assembly located inside the protective housing, in particular the scale signal receiver 206). For example, in this case, the mass of the tuned mass damper 260 can be at least 1% of the mass of the scale signal receiver 206, optionally at least 2% of the mass of the scale signal receiver 206, for example approximately 5% of the mass of the scale signal receiver 206. For example, in this case, the mass of the tuned mass damper 260 could be configured such that it is not more than 30% of the mass of the scale signal receiver 206, optionally not more than 25% of the mass of the scale signal receiver 206.

As shown in FIG. 4, the tuned mass dampers 260 are located inside cylindrical holes provided by the scale signal receiver 206. Although not shown, in the particular embodiment described, the sides of the cylindrical holes comprises a plurality of elongate, axially extending ridges (or "splines") such that the outer circumference of the elastomer rings 262 engages said ridges, thereby reducing the contact area between the elastomer rings 262 and the inside of the hole. This helps to keep down the stiffness of the elastomer rings 262, which in turn helps to reduce the natural frequency of the tuned mass dampers 260. Such a configuration avoids the need to use a greater mass 264 or softer elastomer rings 262 to obtain the desired damping effect.

As will be understood, the elastomer rings 262 and the cylindrical hole in which the tuned mass dampers 260 are located could be shaped and sized such that the elastomer rings 262 are squashed/compressed within the holes. As will be understood, even in such a case, the mass element 264 will move/vibrate around independently of the scale signal receiver 206. Alternatively, the elastomer rings 262 and the cylindrical hole in which the tuned mass dampers 260 are located could be shaped and sized such that the elastomer rings 262 are not squashed/compressed within the holes. Accordingly, the elastomer rings 262 and the cylindrical hole in which the tuned mass dampers 260 are located could be shaped and sized such that the elastomer rings 262 are free to rattle/bounce around within the holes.

FIGS. 6a, 6b, 7a and 7b illustrate further alternative implementations of suitable vibration control devices. With respect to FIGS. 6a and 6b, the vibration control device comprises a mass element 364 connected to the outer case 207 of the scale signal receiver 206 via a spring and damper element 362. In this case the spring and damper element 362 is a block of elastomer material, such as rubber. The mass element 364 is therefore able to vibrate independently of the scale signal receiver 206, by virtue of the flexibility of the spring and damper element 362 (which acts as a spring and a damper, by way of absorbing energy and converting the energy to heat).

Figure 7A:
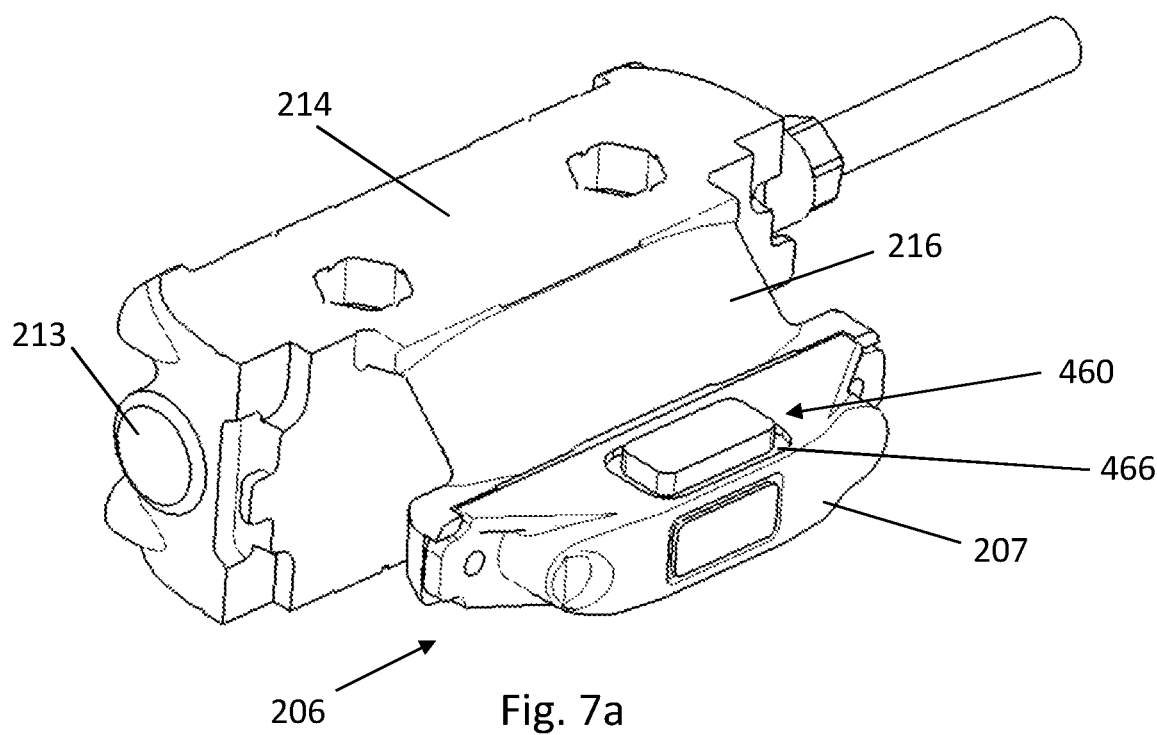
FIGS. 7a and 7b illustrate yet another way of implementing a vibration control device on a readhead assembly.
Figure 7B:
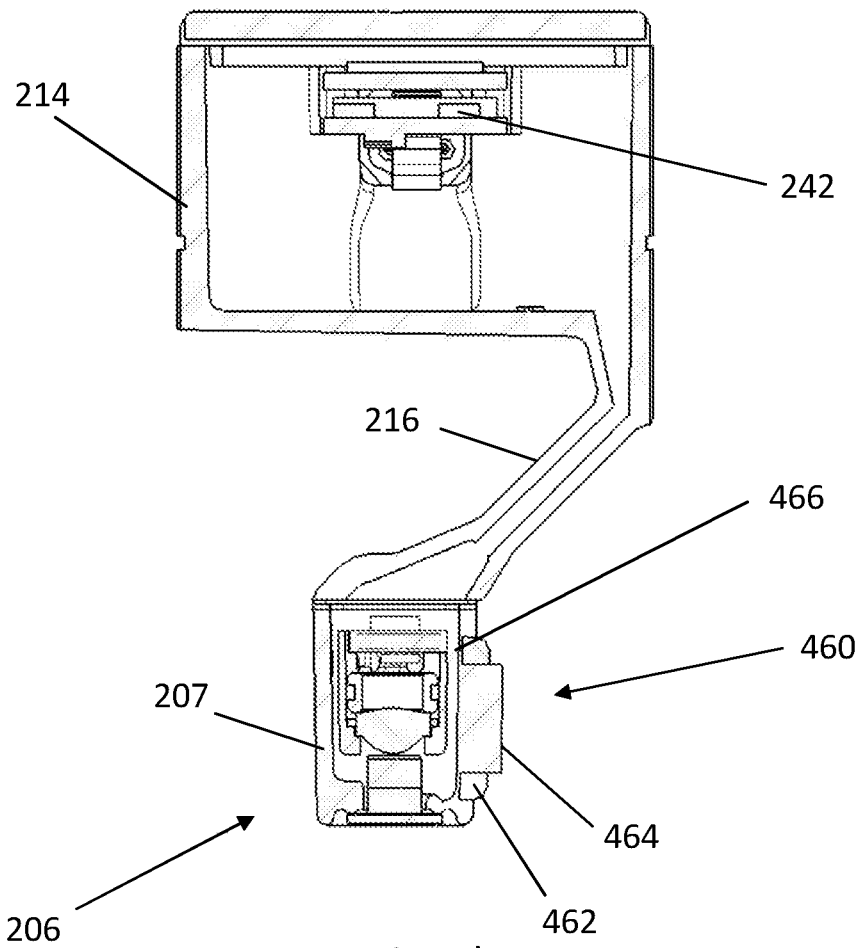

FIGS. 7a and 7b illustrate another alternative embodiment comprising a tuned mass damper 460. In this case the tuned mass damper 460 comprises a mass 464 formed as an integral part (e.g. via a single moulding) of the outer case 207 of the scale signal receiver 206. The tuned mass damper also comprises a spring element 466 which is also formed as an integral part of the outer case 207 of the scale signal receiver 206. As shown in the cross-sectional drawing of FIG. 7b, the material of the spring element 466 provided by the outer case 207 is sufficiently thin so as to be flexible enough to enable the mass 464 to move and vibrate relative to the rest of the scale signal receiver 206. In this embodiment, a separate damping element 462 (shown in FIG. 7b) is provided, which comprises an elastomer ring 462 that extends around a trough in the outer case 207 resulting from the presence of the integrally formed spring element 466.

As will be understood, FIGS. 6b and 7b also illustrate how that the blade 216 can be hollow for the passage of wires (not shown) and/or air (as explained above). These figures also show how that the mounting block 214 can comprise space for components such as at least one processor device 242 (as explained in more detail above).

As schematically illustrated by FIG. 8a, the spring and damper parts of the tuned mass damper need not be provided by a common part. For example, an example tuned mass damper 560, can comprise a mass 562, and one or more (in this case four) springs 566 (which have little or no substantial damping effect) and one or more (in this case four) damping elements 564.

In the above described embodiments, the vibration control device comprises a tuned mass damper. However, as will be understood, this need not necessarily be the case. For example, the vibration control device could comprise a vibration absorber 660, an example of which is illustrated in FIG. 8b. As schematically illustrated, a vibration absorber 660 can comprise a mass element 662, and one or more springs 666 (in this example four springs 666) which enable the mass 662 to move/vibrate independently of the outer case 207 and the rest of the scale signal receiving unit 206.

In the embodiments depicted in FIGS. 8a and 8b, the vibration controllers 560, 660 are located in a recess provided in the outer case 207 of the scale signal receiver 206, but as will be understood other arrangements are possible. For example, as shown in FIG. 8c the vibration controller 760 (comprising a mass element 762, spring 766 and optionally a damper element 764) could be connected to the side of the outer case 207 of the scale signal receiving unit 206.

In the above described embodiments, the encoder and scale are linear. However, as will be understood, the invention is equally applicable to non-linear encoders/scale, for example rotary encoders such as disc and/or ring encoders. FIGS. 9a and 9b schematically illustrate example implementations of such embodiments. In the embodiment of FIG. 9a, the scale 804 is provided on the face of a disc (shown as a dashed line) and is contained within a cylindrical protective housing 808. A circular seal 811, through which the blade 216 of a readhead assembly can pass, is provided on the end face of the cylindrical protective housing 808 (although as will be understood could be provided on the cylindrical side face of the cylindrical protective housing 808 if desired). In the embodiment of FIG. 9b, the scale 904 is provided on the circumferential side of a ring (shown as a dashed line) and is contained within a cylindrical protective housing 908. A circular seal 911, through which the blade 216 of a readhead assembly can pass, is provided on the cylindrical side face of the cylindrical protective housing 908 (although as will be understood could be provided on the end face of the cylindrical protective housing 908 if desired). In these embodiments, the readhead assembly (comprising the scale signal receiver 207, mounting block 214 and blade 216) can be the same as described above (although in the embodiment of FIG. 9a, it might be beneficial for the blade to be curved to follow the curvature of the seal 811). In both these embodiments, a light emitter 213 is provided on the mounting block 214 and the encoder is configured to control the light emitter to relay diagnostic information.

In the embodiments described above, the readhead assembly comprises a scale signal receiver 106, mounting block 114 and a blade 116. However, as will be understood, the readhead assembly could comprise a scale signal receiver 106 only. For example, the blade could be provided by the machine on which the scale signal receiver 106 is to be mounted. For example, in connection with the above described embodiments, the sealed encoder module could be supplied without a mounting block 114 and/or blade 116, but rather just the scale signal receiver 106 which is (or is to be) located inside the protective housing 108. During set up, the scale signal receiver 106 can be connected to a blade or equivalent which is provided by the machine on which the encoder apparatus is being installed.

In the above described embodiments, the encoder is a reflective optical encoder (e.g. the readhead detects the scale by light reflected from the scale, and the readhead's light source and detector(s)/sensor(s) are located on the same side of the scale). As will be understood, the encoder could be a transmissive optical encoder (in which case the readhead's light source and detector(s)/sensor(s) are on opposite sides of the scale). As will also be understood, the invention is applicable to non-optical encoders (e.g. magnetic, inductive and/or capacitive encoders).

As described above, the scale comprises features which are used to provide a signal detectable by the readhead assembly's sensor. In the embodiments described above, the encoder/scale comprises an absolute encoder/scale. The readhead decodes the image obtained to determine an absolute position. However, this need not necessarily be the case. For example, the encoder/scale could be an incremental encoder/scale (with or without reference marks). As is well known, the readhead could be configured to output quadrature signals which can be used to determine relative motion and/or position of the scale and readhead. In this case, an alternative technique could be used to determine diagnostic information that can be used to determine how to control the light emitter 113, 213. For example, the encoder module (e.g. the readhead) could be configured to determine whether the quadrature signal levels are above or below given threshold levels to determine how to control the light emitter 113, 213. Further details of such a process are described in U.S. Pat. No. 5,241,173, the content of which is incorporated herein by this reference.

The encoder could be diffraction-based, e.g. the signal detected by the scale sensor assembly's sensor is formed by the scale (and one or more diffraction gratings in the scale sensor assembly) diffracting light (e.g. forming an interference fringe at the scale sensor assembly's sensor).

As will be understood, references to light in this application comprise electromagnetic radiation (EMR) in the ultra-violet to infra-red range.

In the above described embodiments, a vibration control device is used to reduce the susceptibility of the scale signal receiver to vibrations. However, as will be understood, a vibration control device is optional. Indeed, a vibration control device might be unnecessary depending on the frequency of the vibration the encoder is to be exposed to and the resonant frequency of the scale signal receiver.

Optionally, any vibrations induced in the scale signal receiver could be sufficiently small so as to not affect the structural stability of the scale signal receiver and/or produce measurement errors which are within desired tolerances.

In the above described embodiments, the scale signal receiver comprises an outer casing which encapsulates the scale signal receiver components. However, this need not necessarily be the case. For example, the electronic and/or other (e.g. optical) components could be exposed. For example, the PCB 240 could be exposed within the protective housing 108.

In the embodiments described, a light emitter 113, 213, is provided on the readhead to relay diagnostic information determined by the encoder. However, as will be understood, this need not necessarily be the case. For example, as illustrated in FIGS. 2a, 2b, 9a, 9b, a light emitter 113', 213' could be provided on the protective housing 108, 808, 908 instead of/in addition to the light emitter on the readhead. In this case, the protective housing could comprise an internal power source (e.g. a battery) for powering the light emitter and/or could be connected to an external power source. Furthermore, the protective housing could be configured to receive diagnostic information from the readhead in order to determine how to control the light emitter. Optionally, the protective housing is configured to receive the scale signal detected by the readhead and is configured to determine the diagnostic information itself in order to determine how to control the light emitter. Either way, the protective housing could comprise its own processor device configured to determine how to control the light emitter (e.g. in response to the diagnostic received and/or subsequent to it determining the diagnostic information itself).

Furthermore, in other embodiments, additionally or alternatively to such a light emitter being provided, the encoder module could be configured to determine and output diagnostic information in the form of one or more electronic signals to an external device (e.g. a controller), for example via cable 105, 205. For instance, diagnostic information concerning the quality of the scale signal detected by the readhead could be determined and output by the encoder module. The external device receiving this information could, for example, display this information to an operator. Such diagnostic information could be useful to help an operator determine the status of the encoder module, e.g. to determine if the encoder module is operating properly and take action if it is not (e.g. stop the machine on which the encoder module is installed and/or replace the encoder module).

As will be understood, the capability of determining and outputting diagnostic information is optional.

As will also be understood, a bracket (e.g. a "transit bracket") or the like can be used to keep the readhead assembly and the protective housing in a predetermined physical relationship, e.g. such as when they are not mounted on a machine.

The invention claimed is:

1. An encoder apparatus comprising a scale and a readhead assembly comprising a scale signal receiver, the scale and the scale signal receiver being located within a protective housing which is configured to protect them from contamination located outside the protective housing, the scale signal receiver and the protective housing being relatively moveable with respect to each other, the protective housing comprising a seal through which the scale signal receiver can be connected to a part outside the protective housing, and in which the arrangement of the scale signal receiver inside the protective housing is independent of the scale and protective housing, and in which the scale signal receiver comprises at least one vibration control device comprising at least one member configured to vibrate independently of the rest of the scale signal receiver and configured to reduce the susceptibility of the scale signal receiver of the readhead assembly to vibrations.

2. An encoder apparatus as claimed in claim 1, in which the readhead assembly comprises a readhead mount comprising mounting features located outside the protective housing for securing the readhead assembly to a part of a machine, and in which the scale signal receiver of the readhead assembly is rigidly connected to the readhead mount.

3. An encoder apparatus as claimed in claim 2, in which the scale signal receiver is rigidly mounted to the readhead mount such that the position and orientation of the scale signal receiver within the protective housing, in all six degrees of freedom, is dictated by, and mastered to, the readhead mount.

4. An encoder apparatus as claimed in claim 1, in which the at least one vibration control device comprises at least one member which is configured to vibrate independently of the scale signal receiver.

5. An encoder apparatus as claimed in claim 4, in which the at least one member is configured with a resonant frequency independent of the scale signal receiver of the readhead assembly that is located inside the protective housing.

6. An encoder apparatus as claimed in claim 1, in which the at least one vibration control device comprises one or more spring elements, one or more mass elements, and one or more damper elements.

7. An encoder apparatus as claimed in claim 6, in which at least one of the one or more spring elements, at least one of the one or more mass elements, and at least one of the one or more damper elements are provided by a single spring mass damper element.

8. An encoder apparatus as claimed in claim 1, in which the at least one vibration control device comprises a tuned mass damper.

9. An encoder apparatus as claimed in claim 1, in which the at least one vibration control device resides within a hole provided by the scale signal receiver, within which it vibrates.

10. An encoder apparatus as claimed in claim 1, wherein the scale signal receiver of the readhead comprises an outer case for protecting at least sensor components of the scale signal receiver.

11. An encoder apparatus as claimed in claim 1, in which the seal comprises at least one pair of seal members, between which a readhead mount can pass.

12. An encoder apparatus a claimed in claim 1, in which the encoder apparatus comprises a linear encoder apparatus.

13. An encoder apparatus as claimed in claim 1, comprising an integral protective housing which encapsulates at least the scale and said scale signal receiver.

14. A readhead as claimed in claim 13, in which the vibration control device is configured to reduce the amplitude of vibrations of the readhead at and around the readhead's resonant frequency.

15. A readhead as claimed in claim 13, in which the vibration control device resides within the readhead.

16. A readhead as claimed in claim 15, in which the vibration control device resides within an outer case of the readhead.

17. A readhead as claimed in claim 15, in which the vibration control device resides within a void provided by the readhead and is configured to be able to vibrate within said void independently of the rest of the readhead.

18. A machine comprising an encoder apparatus and/or readhead as claimed in claim 1.

19. A sealed encoder module for mounting onto a machine so as to measure relative displacement of first and second parts of the machine, the sealed encoder module comprising, a scale, a readhead comprising a scale signal receiver, and an integral protective housing which encapsulates at least the scale and said scale signal receiver, the scale signal receiver and the integral protective housing being relatively moveable with respect to each other, and the integral protective housing comprising a seal through which the scale signal receiver is rigidly fixed to a rigid readhead mount, in which the scale signal receiver comprises at least one vibration control device comprising at least one member configured to vibrate independently of the rest of the scale signal receiver and configured to reduce the susceptibility of the scale signal receiver of the readhead to vibrations.

20. A sealed optical encoder module for mounting onto a machine so as to measure relative displacement of first and second parts of the machine, the sealed optical encoder module comprising, an optical scale, a readhead comprising a scale signal receiver, and an integral protective housing which encapsulates at least the optical scale and said scale signal receiver, the scale signal receiver and the integral protective housing being relatively moveable with respect to each other, the integral protective housing comprising a seal through which the scale signal receiver can be connected to a part outside the integral protective housing, wherein the sealed encoder module does not comprise integral bearings for constraining the scale signal receiver relative to the optical scale and does not comprise integral hearings for constraining the scale signal receiver relative to the integral protective housing, and in which the scale signal receiver comprises at least one vibration control device comprising at least one member configured to vibrate independently of the rest of the scale signal receiver and configured to reduce the susceptibility of the scale signal receiver of the readhead assembly to vibrations.

21. A sealed optical encoder module as claimed in claim 20, in which the sealed optical encoder module comprises a linear sealed optical encoder module.

22. A sealed optical encoder module as claimed in claim 20, in which the optical scale comprises a reflective scale.

* * * * *